United States Patent [19]
Lenkov et al.

[11] Patent Number: 5,560,009
[45] Date of Patent: Sep. 24, 1996

[54] GENERATING SYMBOLIC DEBUG INFORMATION BY MERGING TRANSLATION AND COMPILER DEBUG INFORMATION

[75] Inventors: Dmitry Lenkov; Shankar Unni; Michey Mehta, all of San Jose, Calif.; Mark W. McDowell, Fort Collins, Colo.; Manoj Dadoo, San Jose, Calif.; Bruno Melli, Fort Collins, Colo.

[73] Assignee: Hewlett-Packard Company, Palo Alto, Calif.

[21] Appl. No.: 586,521

[22] Filed: Sep. 21, 1990

[51] Int. Cl.⁶ .................................................. G06F 9/45
[52] U.S. Cl. .................. 395/700; 364/280; 364/280.4; 364/DIG. 1; 364/973; 364/DIG. 2
[58] Field of Search ................................. 395/700, 650, 395/700; 364/280.4, 280, 300

[56] References Cited

U.S. PATENT DOCUMENTS

| | | |
|---|---|---|
| 4,463,423 | 7/1984 | Potash et al. ............................ 364/300 |
| 4,686,623 | 4/1987 | Wallace .................................. 364/300 |
| 4,809,170 | 2/1989 | Leblang et al. ......................... 364/200 |
| 4,821,181 | 4/1989 | Iwasawa et al. ........................ 364/200 |
| 4,827,404 | 5/1989 | Barstow et al. ......................... 364/200 |
| 4,860,203 | 8/1989 | Corrigan et al. ........................ 364/300 |
| 4,916,610 | 4/1990 | Bapat ..................................... 395/700 |
| 4,953,084 | 8/1990 | Meloy et al. ............................ 364/200 |

Primary Examiner—Kevin A. Kriess
Assistant Examiner—Michael T. Richey

[57] ABSTRACT

The present invention comprises a computer-based system and method for generating meaningful symbolic debug information in translator-based software compilation systems. The present invention includes a translator, a compiler, a merger, and a debugger. The compiler and translator each generate symbolic debug information for a source code. The merger combines the debug information generated by the compiler and translator into a final debug information. The final debug information completely and accurately describes the source code. The debugger uses the final debug information to completely and accurately display the original source code, and to efficiently and effectively use actual variable and function names (from the original source code) when working with variables and functions.

27 Claims, 10 Drawing Sheets

GENERATING SYMBOLIC DEBUG INFORMATION BY MERGING TRANSLATION AND COMPILER DEBUG INFORMATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

This invention relates to computer-based systems and methods for generating meaningful symbolic debug information in translator-based software compilation systems.

FIG. 1 shows a structural diagram/functional flowchart of a conventional translator-based compilation system 100. In FIG. 1, rectangles represent software modules/processes and ovals represent the inputs and outputs of the software modules/processes.

As shown in FIG. 1, the conventional translator-based compilation system 100 includes a translator 106, a compiler 114, a linker 128, and a debugger 122.

The translator 106 translates a source code 102 (in the C++ programming language, for example) to an intermediate source code 110 (in the C programming C language, for example). The compiler 114 compiles the intermediate source code 110 and generates object code 124 and debug information 126. The object code 124 and the debug information 126 are stored in an object code file 118.

A linker 128 links the object code file 118 with other object code files 134 to produce an executable file 132. The executable file 132 contains the object code 124 and the debug information 126.

The debug information 126 is very important as the debug information 126 can be used to locate and correct errors in the source code 102 (that is, to "debug" the source code 102). Specifically, under the direction of a user (not shown in FIG. 1), the debugger 122 receives the executable file 132 containing the object code 124 and debug information 126 and uses the debug information 126 to debug the source code 102.

However, in conventional translator-based compilation systems 100, the compiler 114 is not capable of generating accurate and complete debug information 126 for the source code 102. This is true because much of the information about the structure and content of the source code 102 is lost in translating from the source code 102 to the intermediate source code 110.

Therefore, the debug information 126 generated by the compiler 114 cannot be used to efficiently and effectively debug the source code 102.

One prior attempt at solving this problem involved a "do nothing" approach. Under this prior solution approach, the debugger 122 would read the debug information 126 generated by the compiler 114 and optionally try to "demangle" variable and function names and to use heuristic methods to re-create a crude approximation of the original data structures, etc., in the source code 102.

However, under this prior approach, even if the debugger 122 could display the original source code 102, the debugger's 122 diagnostic output would be incomplete at best, and incomprehensible in many cases. Also, in most cases, the user would have to manually specify the "mangled" variable and function names from the intermediate code 110 to the debugger 122 in order to inspect variables and functions.

Another prior attempt at solving this problem involved a "go backwards" approach. Under this prior solution approach, attempts would be made to transform the debug information 126 to reconstruct the original data structures, etc., in the original source code 102. This modified debug information would then be presented to the debugger 122.

However, under this prior approach, the modified debug information would likely be incomplete and even possibly incorrect, because it would not always be possible to reconstruct the source code 102 from the intermediate source code 110.

SUMMARY OF THE INVENTION

The present invention is a computer-based system and method for generating meaningful symbolic debug information in translator-based software compilation systems.

As shown in FIGS. 2 and 3, and as discussed in detail below, the present invention 228 solves the problems inherent in the prior solutions by G advantageously enabling the compiler 114 and a modified translator 302 to each generate debug information 126 and 306, respectively. The debug information 126 and 306 are combined through the innovated use of a merger 312. The resulting object code includes complete and accurate debug information 316. The debug information 316 completely and accurately describes the original source code 102.

The existence of the debug information 316 (which is contained in an executable file 350 that is produced by the linker 128) enables a modified debugger 320 to completely and accurately display the original source code 102, and to efficiently and effectively use actual variable and function names (from the original source code 102) when working with variables and functions. Also, the existence of the debug information 316 enables the debugger 320 to deal with concepts such as overloaded functions, inheritance, and encapsulation.

A better appreciation of these and other advantages and features of the present invention, as well as how the present invention realizes them, will be gained from the following detailed description and drawings of the various embodiments, and from the claims.

BRIEF DESCRIPTION OF THE DRAWINGS

The present invention will be described with reference to the accompanying drawings, wherein:

In FIG. 1, rectangles represent software modules/processes and ovals represent the inputs and outputs of the software modules/processes.

In FIG. 3, rectangles represent software modules/processes and ovals represent the inputs and outputs of the software modules/processes.

In FIG. 4, rectangles represent software modules/processes and ovals represent the inputs and outputs of the software modules/processes.

In FIG. 5, rectangles represent software modules/processes and ovals represent the inputs and outputs of the software modules/processes.

In FIG. 7, rectangles represent software modules/processes and ovals represent the inputs and outputs of the software modules/processes.

DETAILED DESCRIPTION OF THE PREFERRED EMBODIMENT

TABLE OF CONTENTS 1.0. Overview
2.0. Translator
3.0. Merger
  3.1. Input Object File Interface
    3.1.1. Core Object File Class
    3.1.2. Specialized Class
  3.2. Debug Information Manipulator
    3.2.1. Step 802—Build Lookup Tables
    3.2.2. Step 806—Match Lookup Tables
    3.2.3. Step 810—Fix
    3.2.4. Step 814—Clean Up
  3.3. Output Object File Interface
4.0. Debugger

1.0. OVERVIEW

Figure 3:
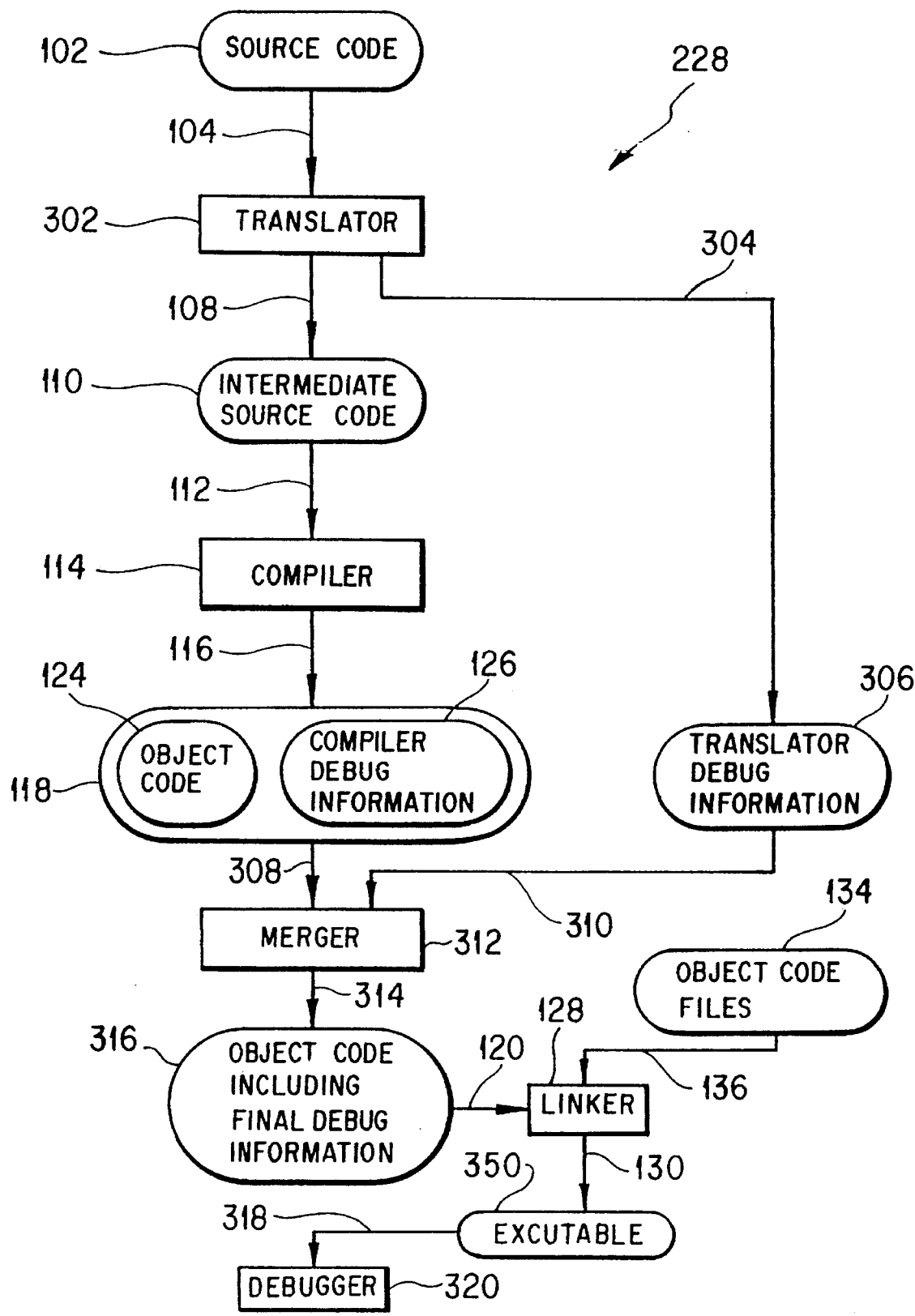
FIG. 3 shows a structural diagram/functional flowchart of a preferred embodiment of the present invention.

FIG. 3 shows a structural diagram/functional flowchart of a translator-based compilation system of the present invention 228. In FIG. 3, rectangles represent software modules/processes and ovals represent the inputs and outputs of the software modules/processes.

As shown in FIG. 3, the present invention 228 solves the problems inherent in the prior solutions by advantageously enabling the compiler 114 and a modified translator 302 to each generate debug information 126 and 306, respectively. The debug information 126 and 306 are combined through the innovated use of a merger 312. The resulting object code includes complete and accurate debug information 316. The debug information 316 completely and accurately describes the original source code 102.

As explained in detail below, the existence of the debug information 316 enables a modified debugger 320 to display the original source code 102, and to use actual variable and function names (from the original source code 102) when working with variables and functions. Also, the existence of the debug information 316 enables the debugger 320 to deal with concepts such as overloaded functions, inheritance, and encapsulation.

Figure 1:
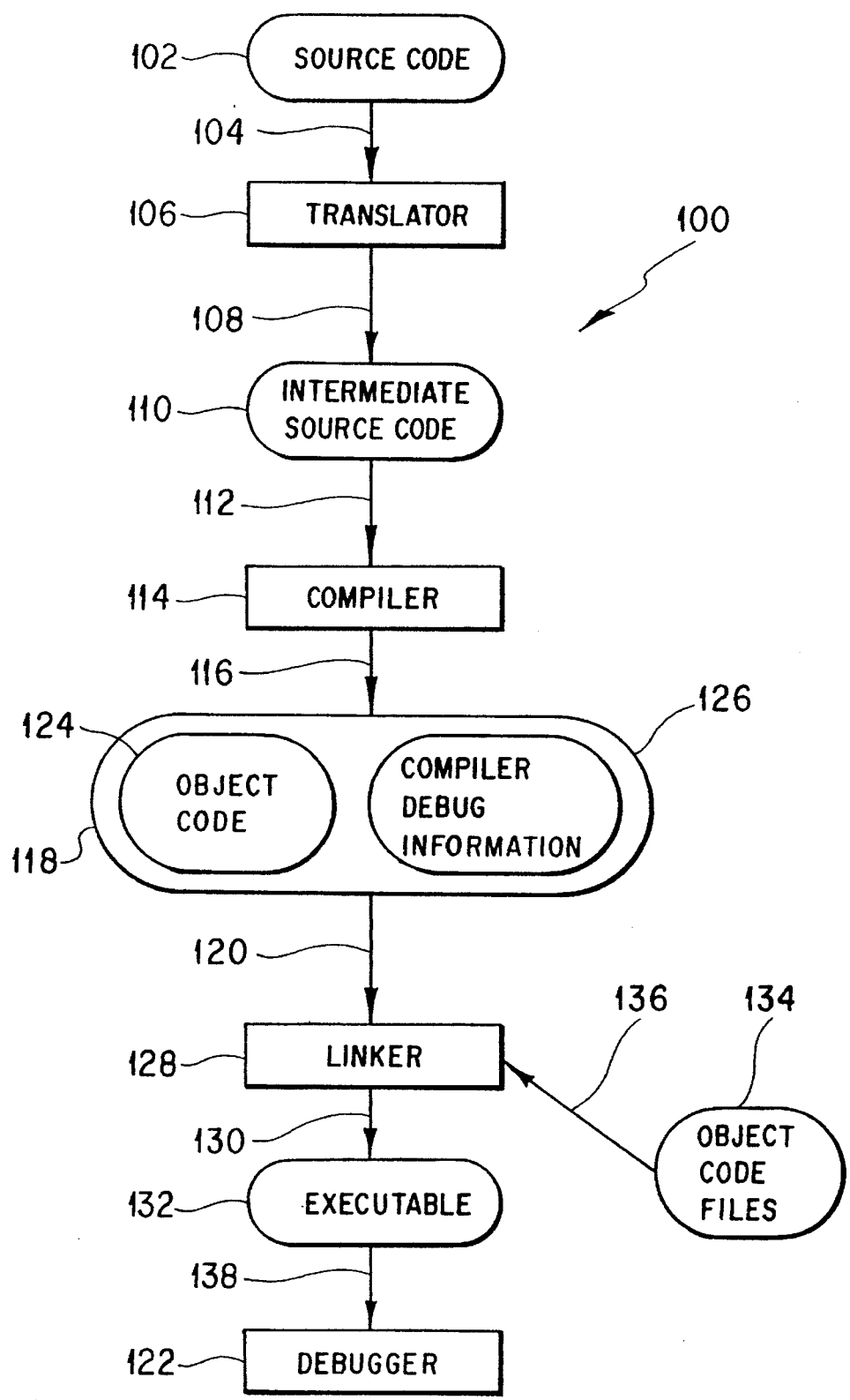
FIG. 1 shows a structural diagram/functional flowchart of a conventional translator-based compilation system.
Figure 2:
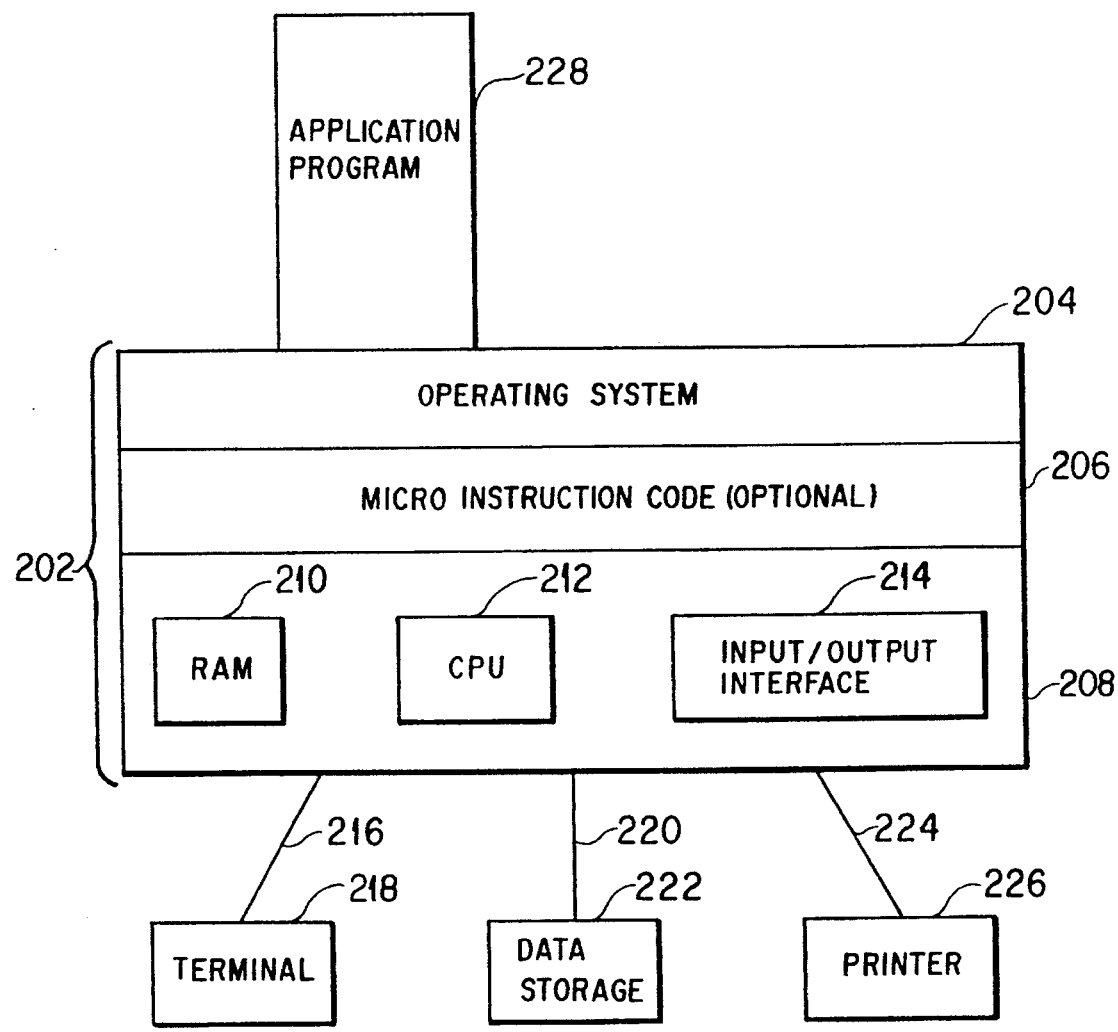
FIG. 2 shows a structural diagram which illustrates the computer hardware and software environment in which the present invention operates.

As shown in FIG. 2, the translator-based compilation system of the present invention is an application computer program 228 which operates on a computer platform 202. The computer platform 202 includes certain hardware units 208 including a central processing unit (CPU) 212, a random access memory (RAM) 210, and an input/output interface 214. The computer platform 202 includes an operating system 204, and may include microinstruction code 206. Various peripheral components may be connected to the computer platform 202, such as a terminal 218, a data storage device 222, and a printing device 226.

In a preferred embodiment of the present invention 228, the computer platform 202 is a HP9000 Series 300, 600, or 800 computer platform and the operating system 204 which runs thereon is HP-UX version 7.0. Also, the translator-based compilation system of the present invention 228 is preferably written in the C++ computer programming language.

The HP9000 Series 600 and 800 computer platforms are essentially the same. Therefore, references herein to the HP9000 Series 800 computer platform should be understood to refer to both the HP9000 Series 600 and 800 computer platforms.

As shown in FIG. 3, the translator-based compilation system of the present invention 228 includes the modified translator 302, the compiler 114, the innovative merger 312, the linker 128, and the modified debugger 320.

The operation of the present invention 228 will now be generally described with reference to FIG. 3.

The translator 302 receives as input the source code 102. The source code may be written in a high-level programming language, such as C++. The translator 302 generates an intermediate version of the source code 102. The intermediate version of the source code 102 is called an intermediate source code 110 and may be written in a computer programming language such as C.

The translator 302 also generates translator debug information 306. Unlike the compiler debug information 118 (described below), the translator debug information 306 accurately reflects the structure and content of the source code 102. However, the translator debug information 306 is not complete because the translator 302 has no knowledge of machine specific compiler decisions such as storage allocation and code generation.

The compiler 114 receives the intermediate source code 110 and generates object code 124 for the source code 102. The compiler 114 also generates compiler debug information 126. The object code 124 and the debug information 126 are stored in the object code file 118.

Unlike the translator 302, the compiler 114 does have knowledge of machine specific compiler decisions such as storage allocation and code generation. Therefore, the compiler debug information 126 is not lacking in this respect. However, as described above, the compiler debug information 126 still does not completely and accurately represent the structure and content of the source code 102.

The merger 312 receives the object code file 118 and the translator debug information 306. As described above, the compiler debug information 126 and the translator debug information 306 are both lacking in certain areas. However, these areas do not overlap. Therefore, the merger 312 merges the information found in the compiler debug information 126 and the translator debug information 306 to produce the final debug information 316. The merger 312 combines the final debug information 316 with the object code 118 produced by the compiler 114 to form object code which includes the final debug information 316.

The final debug information 316 completely and accurately represents the original source code 102.

The linker 128 links the object code which includes the final debug information 316 with other object code files 134. The linker 128 produces the executable file 350 which includes the final debug information 316.

The debugger 320 receives the executable file 350 containing the final debug information 316 as input. Under the direction of a user (not shown in FIG. 3), the debugger 320 uses the final debug information 316 to display the original source code 102, and to use actual variable and function names (from the original source code 102) when working with variables and functions. Also, the debugger 320 uses the debug information 316 to deal with concepts such as overloaded functions, inheritance, and encapsulation.

The debugger 320 of the present invention 228 is a modification of conventional debuggers 122 in that the debugger 320 of the present invention 228 contains features to utilize the translator debug information 306 that is embedded in the final debug information 316.

In the preferred embodiment of the present invention, the source code 102 is written in the C++ computer programming language and the intermediate source code 110 is written in the C computer programming language.

However, the systems and methods of the present invention 228 are adapted and intended to function in any translator-based environment. Thus, the scope of the present invention is not limited to the C++/C computer programming languages.

For a general discussion of the C++ computer programming language, see The Annotated C++ Reference Manual by Margaret Ellis and Bjarne Stroustrup (Addison Wesley 1990), which is herein incorporated in its entirety by reference. For a general discussion of the C computer programming language, see *American National Standard for Information Systems—Programming Language C* (document number X3J11/90-013), which is herein incorporated in its entirety by reference.

The following sections describe the systems and methods of the translator-based compilation system of the present invention 228 in greater detail.

Some aspects of the present invention 228, such as the compiler 114, can beimplemented using existing compiler, translator, linker, and debugger technology. However, modifications upon existing translator and debugger technology are necessary to achieve the improvements of the present invention. The discussions in the following sections focus on these modifications upon existing translator and debugger technology (and on the innovative merger 312). For a general discussion of existing compiler, linker, translator, and debugger technology, see *Compilers, Principles, Techniques, and Tools* by Alfred V. Aho, Ravi Sethi, and Jeffrey D. Ullman (Addison Wesley 1986), which is herein incorporated in its entirety by reference.

2.0. TRANSLATOR

Figure 4:
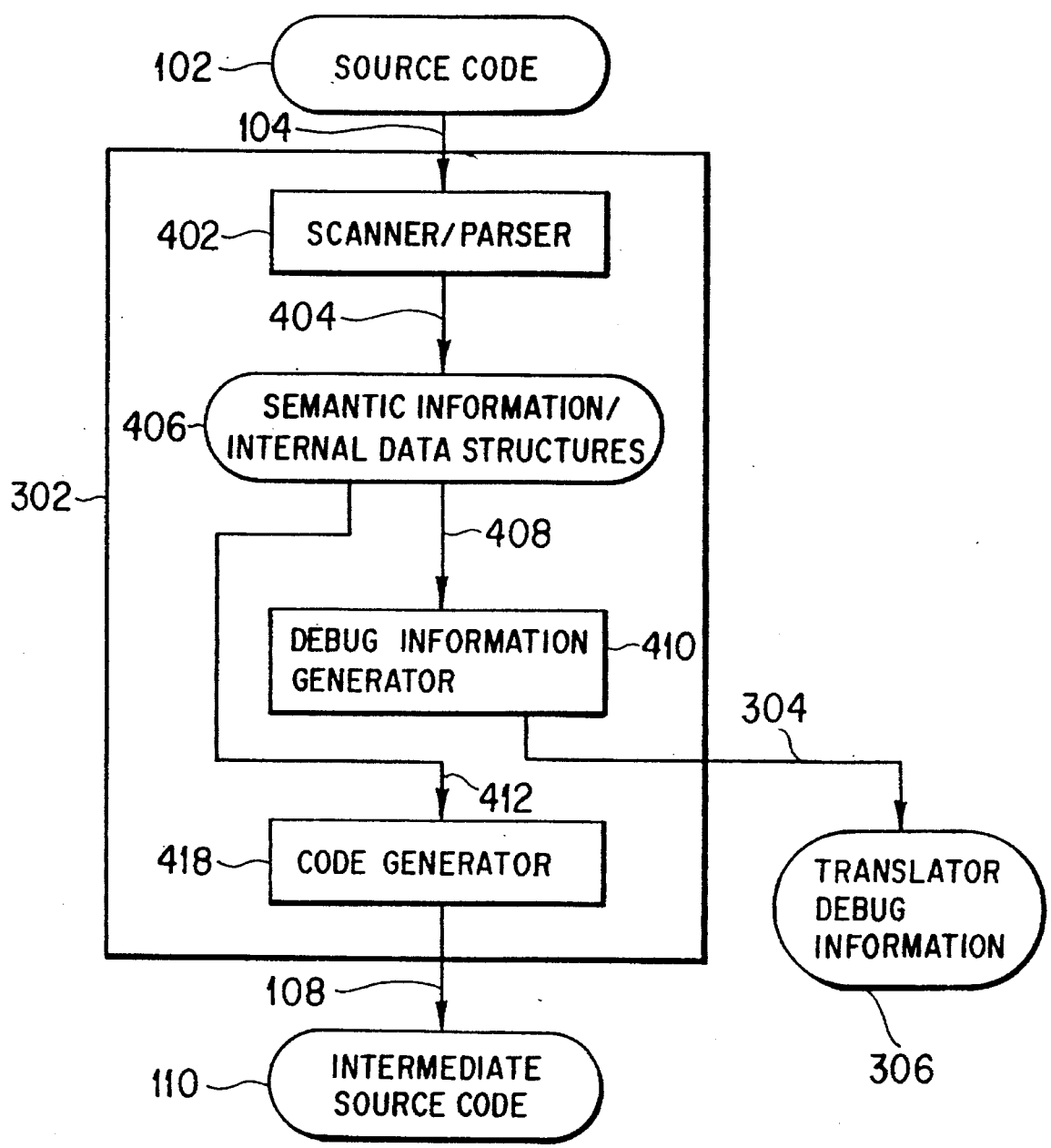
FIG. 4 shows a structural diagram/functional flowchart of a preferred embodiment of the translator, which is a module of the present invention.

FIG. 4 shows a structural diagram/functional flowchart of the translator 302 of the present invention 228. In FIG. 4, rectangles represent software modules/processes and ovals represent the inputs and outputs of the software modules/processes.

As shown in FIG. 4, the translator 302 of the present invention 228 includes a scanner/parser 402, a debug information generator 410, and a code generator 418.

The scanner/parser 402 receives the source code 102, which may be written in a high-level programming language such as C++, and builds internal data structures 406 that contain semantic information 406 that represent the source code 102. The debug information generator 410 receives the internal data structures 406 containing the semantic information 406 and generates the translator debug information 306.

The code generator 418 also receives the internal data structures 406 and generates the intermediate source code 110. The intermediate source code 110 may be written in the C programming language.

The debug information generator 410 contained in the translator 302 operates much like the debug information generator (not shown in any figure) contained in the compiler 114. Thus, a general discussion of the structure and operation of the debug information generator 410 can be found in *Compilers, Principles, Techniques, and Tools* by Alfred V. Aho, Ravi Sethi, and Jeffrey D. Ullman, which is referenced above.

The primary difference between the debug information generator 410 contained in the translator 302 and the debug information generator contained in the compiler 114 is that the debug information generator 410, since it is contained in the translator 302, is privy to the structure and content of the source code 102. Therefore, the translator debug information 306 generated by the debug information generator 410 accurately and completely reflects the structure and content of the source code 102.

However, the debug information generator 410 contained in the translator 302 is not privy to information dealing with machine architecture and machine addresses (including function and variable addresses). Therefore, the translator debug information 306 generated by the debug information generator 410 is lacking with regard to machine architecture and machine address information. The specific aspects in which the translator debug information 306 is lacking is described in detail below.

3.0. MERGER

The merger 312 merges the symbolic debug information 306 produced by the translator 302 with the compiler debug information 126 (and the object code 124) produced by the compiler 114.

Figure 5:
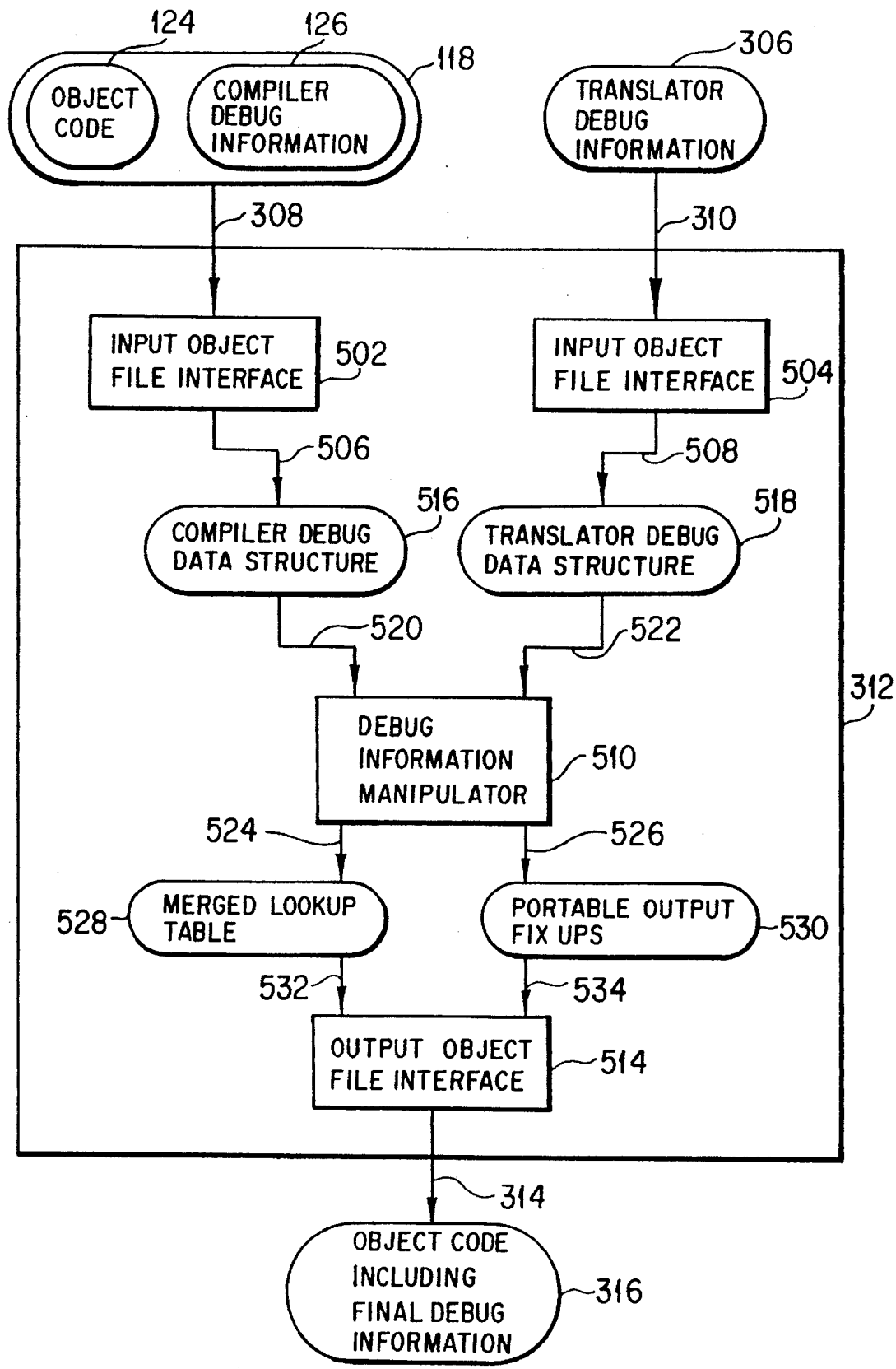
FIG. 5 shows a structural diagram/functional flowchart of a preferred embodiment of the merger, which is a module of the present invention.

FIG. 5 shows a structural diagram/functional flowchart of the merger 312. In FIG. 5, rectangles represent software modules/processes and ovals represent the inputs and outputs of the software modules/processes.

As shown in FIG. 5, the merger 312 includes an input object file interface 502, 504, a debug information manipulator 510, and an output object file interface 514. Generally, the input object file interface 502 reads from the object code file 118 and generates a compiler debug data structure 516. The input object file interface 504 reads from the object/debug file 306 and generates a translator debug data structure 518. The debug information manipulator 510 combines the information contained in the debug data structures 516, 518 and outputs a merged lookup table 528 and a portable output fixups 530. The output object file interface 514 writes to the object/debug file 316.

Figure 6:
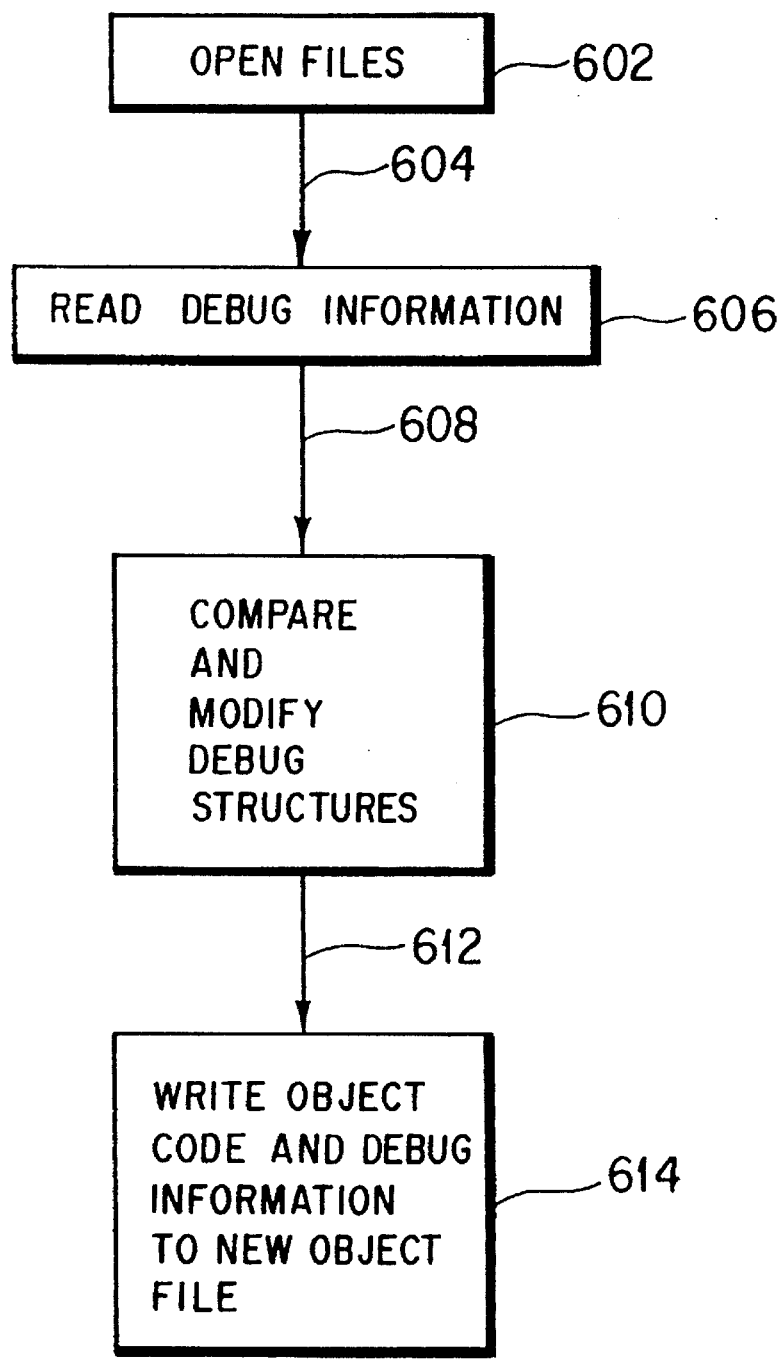
FIG. 6 shows a functional flowchart which illustrates the operation of the merger.

A functional flowchart of the merger 312 is shown in FIG. 6. Operation of the merger 312 is described below with reference to FIGS. 5 and 6.

In steps 602 and 606, the input object file interfaces 502, 504 open the object/debug files 118, 306 and read debug information from the object/debug files 118,306. The input object file interfaces 502, 504 place the debug information in debug data structures 516, 518 which are passed to the debug information manipulator 510.

In step 610, the debug information manipulator 510 compares the debug data structures 516, 518 and copies records from the compiler debug data structure 516 to the corresponding records in the translator debug data structure 518. The updated translator debug data structure is stored in the merged lookup table 528.

In step 614, the output object file interface 514 copies the object code 124 and information from the merged lookup table 528 to a new object code file 316.

The input object file interface 502, 504, the debug information manipulator 510, and the output object file interface 514 are described in greater detail in the following sections.

3.1. Input Object File Interface

As shown in FIG. 5, the input object file interfaces 502 and 504 receive as input the object code file 118 and the translator debug information 306, respectively.

The compiler debug information 126 in the object code file 118 includes various information, including compiler debug name and type tables (that is, a Global Name and Type Table, or GNTT, and a Local Name and Type Table, or LNTT). The compiler debug information 126 also includes a compiler Value Table (VT), which is essentially a table of name strings. The compiler debug information 126 also includes a Source Line Table (SLT) of the compiler's 114 object code 124. The compiler debug information 126 also includes a fixup list, which contains information the linker 128 requires to fixup the compiler's 114 object code 124. The object file 118 includes an object file symbol table, which contains names and addresses of various identifiers (that is, symbols). These symbols are referenced in the fixup list.

Like the compiler debug information 124, the translator debug information 306 includes translator debug name and type tables and a translator Value Table (VT). The translator debug information 306 does not include a Source Line Table (SLT) or a fixup list, since the translator 302 does not generate such information.

The input object file interface 502 reads the compiler debug information 126 and places the compiler debug information 126 in the compiler debug data structure 516. Similarly, the input object file interface 504 reads the translator debug information 306 and places the translator debug information 306 in the translator debug data structure 518. As shown in FIG. 5, the compiler and translator debug data structures 516, 518 are inputs to the debug information manipulator 510.

Both the compiler and translator debug data structures 516, 518 share the same format. This common format is shown in Table 1.

TABLE 1

```
struct debuginfo {
    char      *header;       // the various debug information
                                components
    int       header_len;
    char      *gntt;
    int       gntt_len;
    char      *lntt;
    int       lntt_len;
    char      *slt;
    int       slt_len;
    char      *vt;
    int       vt_len;
    dtab      *gtbl;         // the quick lookup intermediate tables
    dtab      *ltbl;
    oldfixuplist  *oldgfxup;  // the old fixup lists (gntt &
                                lntt)
    oldfixuplist  *oldlfxup;
    newfixuplist  *gfxup;    // the new fixup lists (gntt & lntt)
    newfixuplist  *lfxup;
};
```

Copyright (c) 1990 Hewlett-Packard Company, all rights reserved.

The input object file interface 502 and the input object file interface 504 operate in essentially the same manner. However, there are some minor differences, such differences reflecting their different inputs. For example, the input object file interface 502 includes a software routine to demangle names so that the names in the object code 124 are consistent with those in the source code 102.

In the preferred embodiment of the present invention 228, the input object file interfaces 502, 504 (and also the output object file interface 514) are implemented in the form of classes. Instantiations of these classes are used to read from and write to files containing object code and debug information.

The classes are comprised of two layers: a core object file class, that represents a base class, and a specialized class, that represents a derived class of the core object file base class. These classes are described in the following sections.

3.1.1. Core Object File Class

The core object file class is used to read common object file data structures, like object file headers and symbol tables. The core object file class includes access routines to look up symbols in symbol tables and access routines to look up initialization pointers. The core object file class also includes generic routines to read from and write to object files.

In the preferred embodiment of the present invention 228, there are two core object file classes: som300 and som800. som300 operates with HP9000 series 300 computer platforms 202, and som800 operates with HP9000 series 600 and 800 computer platforms 202. som300 and som800 are discussed in the following sections.

3.1.1.1. The Som300 Class

The primary purpose of the som300 class abstraction is to provide an efficient and user-friendly interface to object/debug files 118, 306, 316. Computer program segments which comprise the som300 class are presented in Table 2.

TABLE 2

```
class coffheader : public exec {
    public:
        coffheader( ) { }
        coffheader(fstream&);
        coffheader(coffheader& other) {*this = other;}
        int validate( );
};
class syment300 : public nlist_ {
    public:
```

TABLE 2-continued

```
    syment300( ) {name = NULL;};
    ~syment300( );
    char *name;
    int copy(char *ptr);
    int symsiz( ) {return  (    sizeof(long) +
                            2 * sizeof(char) +
                            2 * sizeof(short) +
                            n_length);}
    syment300& operator= (syment300& other);
    friend int digest(char *, long, syment300 *&);
};
class som300 {
    protected:
        char        open;           // is this som open?
        char        valid;          // is this som valid?
        coffheader  *header_ptr;    // pointer to obj file
                                    //   header
        syment300   *sym;           // pointer to symbol
                                    //   table
        int         sym_count;      // number of symbols
        long        start_of_data;  // offset to initialized
                                    //   data
                                    // in object file
        fstream     *somfile;       // open file pointer for
                                    //   I/O.
    public:
    //  CONSTRUCTORS AND DESTRUCTOR
                som300( );
                som300(char *filename, int mode=ios::in);
                    // initialize with
            // file name
                ~som300( );
    //  QUICK VALIDITY CHECKING ROUTINE
                operator int( ) {return valid;}
    //  PACKAGED I/O ACCESS ROUTINES
    //  These perform the same functions as their
    //              fstream counterparts
        streampos   tellg ( )
                    {
                        return somfile->tellg( );
                    }
        istream&    seekg (streamoff so, seek_dir sd)
                    {
                        return somfile->seekg(so, sd);
                    }
        istream&    read (char *s, long n)
                    {
                        return somfile->read(s, (int) n);
                    }
        streampos   tellp ( )
                    {
                        return somfile->tellp( );
                    }
        ostream&    seekp (streamoff so, seek_dir sd)
                    {
                        return somfile->seekp(so, sd);
                    }
        ostream&    write (char *s, long n)
                    {
                        return somfile->write(s, (int) n);
                    }
    //  SYMBOL TABLE ACCESS ROUTINES
        int         num_symbols( ) {return sym_count;}
        syment300   *get_symbols( ) {return sym;}
        syment300   *find_symbol(char *);
        char        *sym_name (syment300& s)
                    {
                        return s.name;
                    }
        long        sym_loc      // where in file
                    (symet300& s);
                                        // sym points to
        long        sym_val      // where in loaded prog.
                    (syment300& s);
                                        // sym points to
};
```

Copyright (c) 1990 Hewlett-Packard Company, all rights reserved.

A sum_loc() function returns the place in the object/debug file 118, 306 where a symbol's initialization value is stored. The sum_loc() function is used to patch up the initialization pointers.

A sum_val() function returns the run-time address of a symbol when a computer program is loaded into RAM 210.

A coffheader class is used primarily as a wrapper around the header, in order to add constructors and a verifier function.

A syment300 class is important. The normal representation of symbols in the object file 118 produced on the HP9000 series 300 computer platform 202 is a crunched record (struct nlist_), followed by an exact, non-null-terminated number of bytes with the symbol name. This is difficult to manipulate.

Thus, as one of its first operations, a som300() constructor reads in the entire symbol table, and converts the symbol table to a form more amenable to use, specifically, an array of syment300 records. The syment300 array has two advantages:

1. Since it is an array of fixed-size records, it is easier to traverse.

2. The name is easier to handle because it is now null-terminated and has a direct pointer to its start.

A copy() function of the syment300 class is used by a digest() function to create syment300 nodes from the raw symbol table, and an operator "=" facilitates copying of such nodes.

3.1.1.2. The Som800 Class

The som800 class is somewhat more complex than the som300 class (due to the complexity of the HP9000 series 600 and 800 object file format). However, the som800 class provides essentially the same functionality as the som300 class.

Computer program segments which comprise the som800 class are presented in Table 3. The classes, data structures, and functions contained in the som800 class are analogous to those found in the som300 classes.

TABLE 3

```
class somheader : public header {
    public:
        somheader( ) { }
        somheader(fstream&);
        somheader(somheader& other) {*this = other;}
        int validate( );
};
class som800 {
    protected:
        char        open;            // is this som open?
        char        valid;           // is this som valid?
        somheader   *header_ptr;     // pointer to object
                                     //   file header
        SPAHDR      *space_dict;     // pointer to space
                                     //   table
        int         space_count;     // number of spaces
        SCNHDR      *subspace_dict;  // pointer to sub-
                                     //   space table
        int         subspace_count;  // number of sub-
                                     //   spaces
        char        *space_strings;  // pointer to space
                                     //   string table
        int         space_strings_size;    // length of
                                           //   -ditto-
        SYMENT      *sym;            // pointer to symbol
                                     //   table
        int         sym_count;       // number of
                                     //   symbols
```

TABLE 3-continued

```
char        *symbol_strings;      // pointer to symbol
                                     string table
int         symbol_strings_size;  // length of
                                     -ditto-
INITPTR     *init_ptrs;           // pointer to
                                     initialization pointers
int         init_ptrs_count;      // number of
                                     -ditto-
fstream     *somfile;             // open file
                                     pointer
public:
  //  CONSTRUCTORS AND DESTRUCTOR
        som800( );
        som800(char *filename, int mode=      // initialize
        ios::in);
                                              // with
                                              // file name
        ~som800( );
  //  QUICK VALIDITY CHECKER
        operator int( ) {return valid;}
  //  PACKAGED I/O ACCESS ROUTINES
  //  These perform the same functions as their
  //           fstream counterparts
        streampos    tellg ( )
                     {
                         return somfile->tellg( );
                     }
        istream&     seekg (streamoff so, seek_dir sd)
                     {
                         return somfile->seekg(so, sd);
                     }
        istream&     read (char *s, long n)
                     {
                         return somfile->read(s, (int) n);
                     }
        streampos    tellp ( )
                     {
                         return somfile->tellp( );
                     }
        ostream&     seekp (streamoff so, seek_dir sd)
                     {
                         return somfile->seekp(so, sd);
                     }
        ostream&     write (char *s, long n)
                     {
                         return somfile->write(s, (int) n);
                     }
  //  SYMBOL TABLE ACCESS ROUTINES
        int          num_spaces( ) {return space_count;}
        int          num_subspaces( ) {return
                     subspace_count;}
        int          num_symbols( ) {return sym_count;}
        int          num_init_ptrs( ) {return
                     init_ptrs_count;}
        unsigned int dp( ) {return header_ptr->presumed_dp;}
        SPAHDR       *get_subspace_dict( )
                     {return subspace_dict;}
        SCNHDR       *get_subspace_dict( ) {return
                     subspace_dict;}
        SYMENT       *get_symbols( ) {return sym;}
        INITPTR      *get_init_ptrs( ) {return init_ptrs;}
        SPAHDR       *find_space(char *);
        char         *space_name (SPAHDR& s)
                     {
                         return &space_strings
                             [s.STR_INDEX];
                     }
        SCNHDR       *find_subspace(SPAHDR *, char *);
        char         *subspace_name (SCNHDR& s)
                     {
                         return &space_strings
                             [s.STR_INDEX];
                     }
        SYMENT *find_symbol(char *, SCNHDR *subsp = NULL,
        int typ = -1);
        char         *sym_name (SYMENT& s)
                     {
                         return &symbol_strings[s.n_offset];
                     }
        long         sym_loc (SYMENT& s);    // where in
                                                file sym
                                             // points to
        long         sym_val (SYMENT& s);    // where in
                                                loaded prog.
                                                sym
                                             // points to
};
```

Copyright (c) 1990 Hewlett-Packard Company, all rights reserved.

3.1.2. Specialized Class

The specialized class includes routines to read and write the compiler and translator debug information 126, 306. The specialized class also includes routines to transcribe the object/debug file 118, 306 to another object/debug file (containing a replacement debug table), and to add symbols to symbol tables contained in the object/debug file 118, 306.

In the preferred embodiment of the present invention 228, there are two specialized classes: debugsom300 and debugsom800. debugsom300 operates with HP9000 series 300 computer platforms 202, and debugsom800 operates with HP9000 series 600 and 800 computer platforms 202. debugsom300 and debugsom800 are discussed in the following sections.

3.1.2.1. The Debugsom300 Class

Computer program segments which comprise the debugsom300 class are presented in Table 4.

TABLE 4

```
class debugsom300 : public som300 {
    protected:
        long         last_written_pos;     // remember the last
                                           //    written
                                           //    position
    public:
    //   CONSTRUCTORS
         debugsom300( );
         debugoom300(char *filename, int mode=     // initialize
         ios::in);
                                                   // with file
                                                   //    name
    //   no destructor
    //   RETURN THE LAST WRITTEN POSITION
         (for seekp's)
         int         endpos( ) {return last_written_pos;}
    //   READ AND WRITE THE DEBUG INFO
         debuginfo   *read_debug_info( );
         int         write_debug_info(debuginfo
                     *new_dbg_info);
    //   ADD A SYMBOL TO THE SYMBOL TABLE
         syment300 *add_symbol(char *nm, int sym_typ, int
         dreloc = 0);
    //   THE WORKHORSE ROUTINE: TRANSCRIBE
         oldsom INTO *this, AND
    //       REPLACE DEBUG INFORMATION WITH
             cpp_info
         int         copy(debugsom300& oldsom, debuginfo
                     *cpp_info);
};
```

Copyright (c) 1990 Hewlett-Packard Company, all rights reserved.

A routine debugsom300() opens the object/debug files 118, 306 and reads parts of their contents. A routine read_debug_info() accesses the files 118, 306 and reads the rest of their contents.

The routine read_debug_info() also writes the information to the debug data structures (presented in Table 1).

3.1.2.2. The Debugsom800 Class

Computer program segments which comprise the debugsom800 class are presented in Table 5. The classes, data structures, and functions contained in the debugsom800 class are analogous to those found in the debugsom300 class.

TABLE 5

```
class debugsom800 : public som800 {
    protected:
        int         last_written_pos;   // the last position
                                        //   written to
        //   ROUTINES TO WRITE OUT FIXUPS
        int         copy_old_fixups(debugsom800&
                                    newsom);
        int         add_new_fixups(void);
    public:
        //   CONSTRUCTORS
        debugsom800( );
        debugsom800(char *filename, int mode=   // initialize
        ios::in);                               // with file name
        //   no destructor
        //   RETURN THE LAST WRITTEN POSITION (for
             seekp's)
        int         endpos( ) {return last_written_pos;}
        //   READ AND WRITE THE DEBUG INFO
        debuginfo   *read_debug_info( );
        int         write_debug_info(debuginfo
                                     *new_dbg_info);
        //   ADD A SYMBOL TO THE SYMBOL TABLE
        SYMENT *add_symbol (char *nm, int sym_type, int
        sym_scope,                        int subsp);
        //   THE WORKHORSE ROUTINE: TRANSCRIBE
             oldsom INTO *this, AND
        //       REPLACE DEBUG INFORMATION WITH
                 cpp_info
        int         copy (debugsom800& oldsom, debuginfo
                          *dbginfo);
        //   READ IN THE OLD FIXUPS
        friend oldfixuplist *read_debug_fixups(debugsom800&,
              int,                                char *);
};
```

Copyright (c) 1990 Hewlett-Packard Company, all rights reserved.

3.2. Debug Information Manipulator

Figure 7:
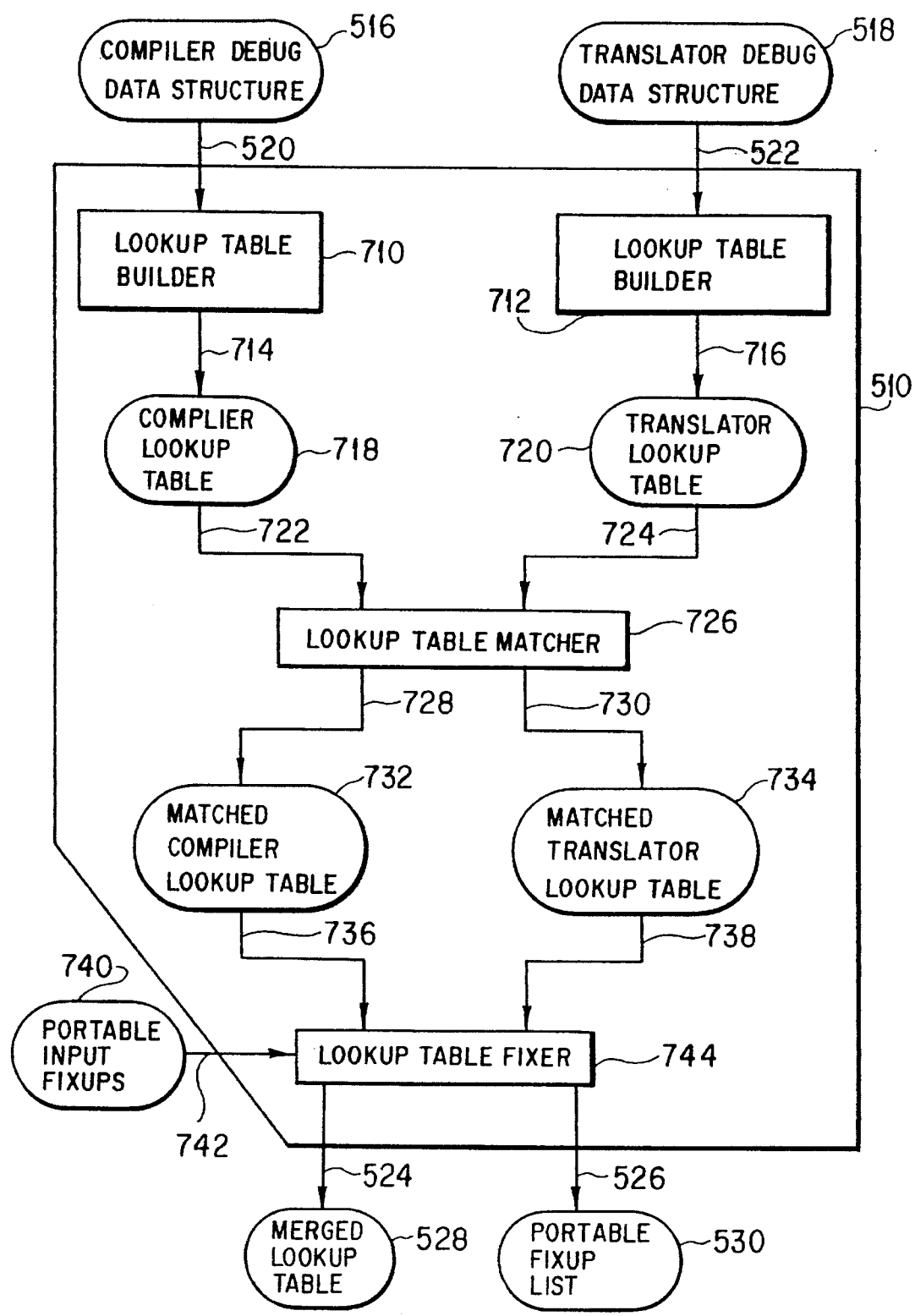
FIG. 7 shows a structural diagram/functional flowchart of a preferred embodiment of the debug information manipulator, which is a module of the merger.

FIG. 7 shows a structural diagram/functional flowchart of the debug information manipulator 510. In FIG. 7, rectangles represent software modules/processes and ovals represent the inputs and outputs of the software modules/processes.

As shown in FIG. 7, the debug information manipulator includes lookup table builders 710, 712, a lookup table matcher 726, and a lookup table fixer 744.

Figures 8, 9:
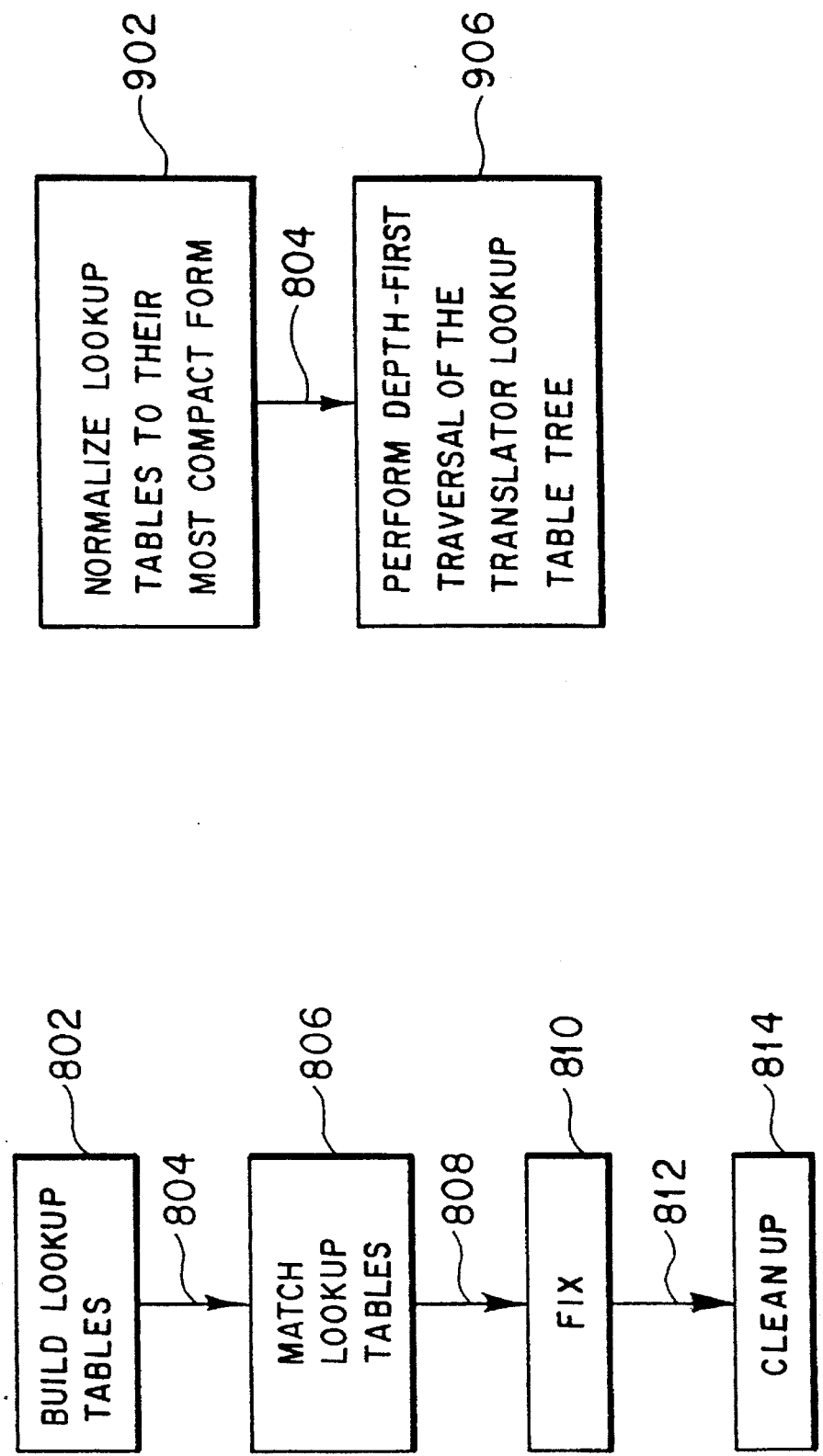
FIG. 8 shows a functional flowchart which illustrates the operation of the debug information manipulator.
FIG. 9 shows a functional flowchart which further illustrates the operation of the debug information manipulator.

FIG. 8 presents a flowchart of the debug information manipulator 510 (the flowchart in FIG. 8 presents a more detailed view of the operation of step 610 in FIG. 6). The operation of the debug information manipulator 510 is now described with reference to FIGS. 5, 7, and 8.

In step 802, the lookup table builders 710 and 712 receive the compiler debug data structure 516 and the translator debug data structure 518 and build the compiler lookup table 718 and the translator lookup table 720. The lookup tables 718, 720 are abstractions of the DNTTs contained within the compiler debug data structure 516 and the translator debug data structure 518, respectively, in that the lookup tables 718, 720 reflect the exact block structure of the DNTTs, with each nested block table containing entries for all significant DNTT entries.

In step 806, the lookup table matcher 726 matches the lookup tables 718, 720 to produce the matched compiler lookup table 732 and the matched translator lookup table 734, respectively. Following the completion of step 806, the entries in the matched compiler lookup table 732 match the entries in the matched translator lookup table 734.

In step 810, the lookup table fixer 744 fixes the matched lookup tables 732, 734. During this fix phase, the lookup table fixer 744 copies information from the matched compiler lookup table 732 to the matched translator lookup table 734.

Specifically, the lookup table fixer 744 traverses the matched lookup tables 732, 734 and copies all possible and necessary information from the matched compiler lookup table 732 entries to their corresponding matched translator lookup table 734 entries. For fields that need to be fixed up, the lookup table fixer 744 creates a "new fixup" node for the output object file interface 514.

The information which is copied from the matched compiler lookup table 732 to the matched translator lookup table 734 includes the debug name and type tables (DNTT), the source line tables (SLT), and the portable fixup list. (As explained above, this information is included in the lookup tables 718, 720.)

Specifically, the values of various entries in the DNTT contained in the matched translator lookup table 734 must be modified with information from the matched compiler lookup table 732. Such DNTT entries include SVAR entries, whose location and offset values must be modified with information from the matched compiler lookup table 732. Other DNTT entries include DVAR and FPARAM entries, whose location and register parameter values must be modified with information from the matched compiler lookup table 732.

Other DNTT entries include FUNC entries, whose entry-addr, lowaddr, hiaddr, address, and optimize values must be modified with information from the matched compiler lookup table 732.

Other DNTT entries include BEGIN, END, CLASS_SCOPE, WITH, LABEL, and OBJECT_ID entries, whose address values must be modified with information from the matched compiler lookup table 732.

Also, the lookup table fixer 744 uses the SLT contained in the matched compiler lookup table 732 to create a SLT for the matched translator lookup table 734. The SLT contains information which indicates the beginning and ending locations of statements and blocks.

While creating the SLT for the matched translator lookup table 734, the lookup table fixer 744 matches SLT entries having to do with scoping, such as BEGIN and END, with their corresponding DNTT entries. Thus, the lookup table fixer 744 adds and deletes SLT entries, and nullifies unmatched DNTT entries, until a matched set of DNTT and SLT entries that correctly reflects the source code 102 block structure is achieved and stored in the matched translator lookup table 734. Unmatched SLT and DNTT entries are marked for removal.

In many cases, information that must be inserted into the matched translator lookup table 734 is unknown until link time. For instance, the address of a static variable, or the code addresses for the start and end of a function, are not known until after linking.

For these cases, the lookup table fixer 744 creates fixups to instruct the linker 128 to insert the appropriate values into the final debug information 316 during the linking process.

Fixups must be created for SVAR, FUNC and OBJECT_ID entries in the DNTT.

In step 814, the lookup table fixer 744 enters a cleanup phase where SLTs and DNTTs marked for removal are deleted (in the case of SLT entries) or nullified (in the case of DNTT entries).

Following the completion of steps 810 and 814, and as shown in FIG. 7, the lookup table fixer 744 outputs the merged lookup table 528, which contains the matched translator lookup table 734, and the portable fixup list 530.

Steps 802, 804, 810, and 814 from FIG. 8 are described in greater detail in the following sections.

3.2.1. Step 802—Build Lookup Tables

The lookup tables 718, 720 which are generated by the lookup table builders 710, 712 are block-structured nested tables which are used to hold entries for DNTTs. The block structure is represented in the form of the following DNTT pairs:

K_MODULE-K_END
K_FUNCTION-K_END
K_BEGIN-K_END

Each such pair is represented by a separate class, all of which are derived from a common base class called dtab.

For example, consider the following computer program excerpt:

```
int v1;
main (int argc, char **argv)
{
    int k = argc;
    if (k > 1) {
        char *foo = argv[0];
    }
    int j = k / 2;
    j += 2;
    if (j > 3) {
        char *foo = argv[1];
    }
}
int v2;
```

Table 6 shows the way in which the lookup table builders 710, 712 would represent this program excerpt in the lookup tables 718, 720.

TABLE 6

| | | |
|---|---|---|
| TABLE (Start NTT: 0; End NTT: 0; Srcf: 0) | | |
| MODULE | (Name: <<<NULL_SYMBOL>>>; Alias: ; Start NTT: 40008988; End NTT: 40008988; Start SLT: −1; End SLT: −1; Srcf: 0) | |
| Src | (Name: t1.c; NTT: 400089a0; SLT: −1) | |
| Svar | (Name: v1; NTT: 40008aa8; off: 0; disp: 0; loc: 0; sym: 0; Srcf: 0) | |
| Svar | (Name: v2; NTT: 40008ac0; off: 0; disp: 0; loc: 0; sym: 0; Srcf: 0) | |
| FUNCTION | (Name: main; Alias: _MAIN_; Start NTT: 400089ac; End NTT: 400089ac; Start SLT: −1; End SLT: −1; Srcf: 400097c8) | |
| Fparam | (Name: argc; NTT: 400089d0; spoff: 0; Srcf: 400097c8) | |
| Fparam | (Name: argv; NTT: 40008a00; spoff: 0; Srcf: 400097c8) | |
| BLOCK | (Start NTT: 40008a18; End NTT: 40008a18; Start SLT: −1; End SLT: −1; Srcf: 400097c8) | |
| Dvar | (Name: j; NTT: 40008a3c; spoff: 0; Srcf: 400097c8) | |

TABLE 6-continued

| | | |
|---|---|---|
| Dvar | (Name: k; NTT: 40008a24; spoff: 0; Srcf: 400097c8) | |
| BLOCK | (Start NTT: 40008a54; End NTT: 40008a54; Start SLT: −1; End SLT: −1; Srcf: 400097c8) | |
| Dvar | (Name: foo; NTT: 40008a6c; spoff: 0; Srcf: 400097c8) | |
| BLOCK | (Start NTT: 40008a90; End NTT: 40008a90; Start SLT: −1; End SLT: −1; Srcf: 0) | |
| Dvar | (Name: foo; NTT: 40008aa8; spoff: 0; Srcf: 0) | |

Copyright (c) 1990 Hewlett-Packard Company, all rights reserved.

There are a number of features of the representation in Table 6 that should be noted. First, each "block" is represented by a table. The outermost level (the global level) is represented by a MODULE table. (Actually, the outermost level should be represented by an outside TABLE, but provision must be made to create a table for DNTT_MODULE entries). The "function" level block is represented by a FUNCTION table. All inner blocks are represented by BLOCK tables.

Second, table nodes contain some general information, and table types have some type-specific information. Specifically, pointers to the DNTT entries corresponding to the start and end of the block are stored for all tables, as are pointers to the immediately previous DNTT_SOURCEFILEs seen just before the start and just before the end (not shown in Table 6) of the block.

Also, SLT indices for the start and end of the corresponding block in the SLT are stored for all functions, blocks, and modules. Also, pointers to the name and alias are stored for all functions, blocks, and modules.

Third, all entries within a block are hashed into the table corresponding to that block. Different types of entries are created, each with some specific information corresponding to that entry type.

Finally, another TABLE table is created (but not shown in Table 6) for exported and imported global variables (corresponding to the GNTT). This table does not have any block structure.

In the preferred embodiment of the present invention, there are five classes which represent the block structure pairs: dtab, blocktab, functab, modtab, and nulltab. These classes are described in detail in the following sections.

3.2.1.1. Class dtab dtab is the base class that implements most of the functionality of the lookup tables 718, 720. The dtab class includes a hash table for the entries, a pointer to a list of subtables, and a back-pointer to its immediate parent table.

In addition, the dtab class includes members for holding state during iterations, and pointers to certain significant debug structures.

dtab is an abstract base class (see the ttyp() declaration in Table 7).

The classes, data structures, variables, and functions which comprise the dtab class are presented in Table 7.

TABLE 7

```
class dtab {
    private:
        dsyment **ent;                      // HASH TABLE OF ENTRIES
        int numbuckets, numtables;
        dtablist *firstchild;               // POINTER TO SUBLIST
                                            // OF TABLES
        dtab *parent;                       // POINTER TO PARENT
                                            // TABLE
        dtablist *nextchild;                // USED BY ITERATOR
        dnttentry *ntt_start, *ntt_end;     // USED BY TABLE
                                            // MATCHER AND FIXER
        SLTPOINTER slt_start, slt_end;      // -ditto-
        dtab *corresponding;                // -ditto-
        dsrcent *srcf, *esrcf;              // POINTERS TO SRCFILE
                                            // TABLE ENTRIES
        fakeblock *n_fakes;                 // "FAKE" BLOCKS
                                            // WITHIN THIS BLOCK
    protected:
        int make_table(int buckets);        // CALLED BY
                                            // CONSTRUCTORS
    public:
        // CONSTRUCTORS AND DESTRUCTOR
        dtab( ) {make_table(DTABSIZ);}
        dtab(int buckets) {make_table(buckets);}
        virtual ~dtab( );
        // TABLE MANIPULATION ROUTINES
        int hash(char *s);
        int insert(dsyment *entry);
        int remove(dsyment *entry);
        dsyment *lookup (char *n, int nofollow=0,
                                int kind=K_NIL);
        int add_subtable (dtab *subtab);
        // DOES THIS TABLE CONTAIN ANY *REAL* ENTRIES?
        int empty( );
        // ACCESS ROUTINES FOR DEBUG INFO POINTERS
        void set_slt_start(SLTPOINTER n) {slt_start = n;}
        void set_slt_end(SLTPOINTER n) {slt_end = n;}
        SLTPOINTER get_slt_start( ) {return slt_start;}
        SLTPOINTER get_slt_end( ) {return slt_end;}
        void set_ntt_start (dnttentry *ntt) {ntt_start =
                                                           ntt;}
        void set_ntt_end (dnttentry *ntt) {ntt_end = ntt;}
        dnttentry *get_ntt_start ( ) {return ntt_start;}
        dnttentry *get_ntt_end ( ) {return ntt_end;}
        void set_sourcefile(dsrcent *x) {srcf = x;}
        void set_endsourcefile(dsrcent *x) {esrcf = x;}
        dsrcent *sourcefile( ) {return srcf;}
        dsrcent *endsourcefile( ) {return esrcf;}
        // FAKE BLOCK ACCESS ROUTINES
        void set_fakes(fakeblock *f) {n_fakes = f;}
        fakeblock *fakes( ) {return n_fakes;}
        // TABLE ITERATORS
        void iter_start( );
        dtab *nextsubtab( );
        // TABLE TYPE
        virtual int ttyp( ) = 0;
        // OTHER MEMBER AND FRIEND DECLARATIONS
};
```

Copyright (c) 1990 Hewlett-Packard Company, all rights reserved.

3.2.1.2. Class Blocktab blocktab is a derived class of dtab. blocktab is the base class of all source blocks. blocktab defines nothing beyond dtab, except a ttyp() operator. ttyp() is used to represent all inner {} symbol tables inside a function.

The classes, data structures, variables, and functions which comprise the blocktab class are presented in Table 8.

TABLE 8

```
class blocktab : public dtab {
    public:
        // CONSTRUCTOR
        blocktab( ) { }
```

TABLE 8-continued

```
        // TABLE TYPE
        virtual int ttyp( );            // K_BEGIN
};
```

Copyright (c) 1990 Hewlett-Packard Company, all rights reserved.

3.2.1.3. Class functab functab is a derived class of blocktab. functab is used to represent the outermost blocks of functions. functab defines the names and aliases of functions. functab also defines a set of access routines to access and modify the names and aliases.

The classes, data structures, variables, and functions which comprise the functab class are presented in Table 9.

TABLE 9

```
class functab : public blocktab {
    private:
        char *n__name, *n__alias;  // NAME AND ALIAS OF
                                   FUNC
    public:
        // CONSTRUCTOR
        functab(char *n, char *a);
        // ACCESS ROUTINES FOR NAME AND ALIAS
        char *name( ) {return n__name;}
        char *alias( ) {return n__alias;}
        void set__name (char *n) {n__name = n;}
        void set__alias (char *n) {n__alias = n;}
        // TABLE TYPE
        virtual int ttyp( );         K__FUNCTION
};
```

Copyright (c) 1990 Hewlett-Packard Company, all rights reserved.

3.2.1.4. Class modtab modtab is a derived class of blocktab. modtab is essentially the same as functab, and could alternatively be derived from functab.

modtab redefines the ttyp() function.

The classes, data structures, variables, and functions which comprise the modtab class are presented in Table 10.

TABLE 10

```
class modtab : public blocktab {
    private:
        char *n__name, *n__alias;  // NAME AND ALIAS OF
                                   // MODULE
    public:
        // CONSTRUCTOR
        modtab(char *n, char *a);
        // ACCESS ROUTINES FOR NAME AND ALIAS
        char *name( ) {return n__name;}
        char *alias( ) {return__alias;}
        void set__name (char *n) {n__name = n;}
        void set__alias (char *n) {n__alias = n;}
        // TABLE TYPE
        virtual int ttyp( );         // K__MODULE
};
```

Copyright (c) 1990 Hewlett-Packard Company, all rights reserved.

3.2.1.5. Class nulltab nulltab is a derived class of dtab. nulltab is used to represent the outermost level of the local and global NTTs. For instance, the GNTT is represented by a nulltab containing all the global SVARs. Similarly, the modtab in the LNTT is wrapped inside a nulltab.

The main feature of the nulltab class is the ability to be instantiated with a different hash table size (useful for the GNTT, where the table is essentially flat, causing a small hash table to have many collisions).

The classes, data structures, variables, and functions which comprise the nulltab class are presented in Table 11.

TABLE 11

```
class nulltab : public dtab {
    public:
        // CONSTRUCTORS
        nulltab ( ) { }
        nulltab(int buckets) : dtab(buckets) { }
        // TABLE TYPE
```

TABLE 11-continued

```
        virtual int ttyp( );         // K__NIL
};
```

Copyright (c) 1990 Hewlett-Packard Company, all rights reserved.

3.2.2. Step 806—Match Lookup Tables

During step 806 the lookup table matcher 726 matches the entries in the compiler lookup table 718 with the entries in the translator lookup table 720.

FIG. 9 presents a flowchart of the operation of the lookup table matcher 726 (in other words, FIG. 9 presents a detailed flowchart of the operation of step 806). In step 902, the lookup table matcher 726 normalizes, or reduces, the lookup tables 718, 720 to their most compact form.

In step 906, the lookup table matcher 726 performs a depth-first traversal of the translator lookup table 720, matching up elements in the translator lookup table 720 with their counterparts (or one of their ancestors) in the compiler lookup table 718.

Steps 902 and 906 are described in greater detail in the following sections.

3.2.2.1. Step 902—Normalize Lookup Tables

During step 902 the lookup table matcher 726 identifies and disgards uninteresting tables. The goal during this step is to compress the lookup tables 718, 720 to their minimum size so that the subtables in the lookup tables 718, 720 each have at least one interesting entry. By accomplishing this goal in step 902, the lookup table matcher 726 can then successfully match the lookup tables 718, 720 entry for entry in step 906.

In performing step 902 the lookup table matcher 726 ignores type entries. The lookup table matcher 726 pays attention to only variable entries (such as SVARs, DVARs, and FPARAMs), since only variable entries require debug information modification.

The object code file 118 contains many entries for temporaries created by the translator 302. These temporaries change the block structure of the compiler debug information 126 contained in the compiler debug data structure 516. For example, tables which are empty in the tranlator lookup table 720 could be non-empty in the compiler lookup table 718.

Therefore, during step 902, the lookup table matcher 726 ignores DVARs which represent temporaries created by the translator 302. Such DVAR temporaries may be identified by their names. In the preferred embodiment of the present invention, the DVAR temporaries are assumed to have names which start with the string "__[A–Z]" (that is, two underscore characters followed by an uppercase letter).

In the preferred embodiment of the present invention, the lookup table matcher 726 uses the pseudo-code algorithm presented in Table 12 for performing step 902.

TABLE 12

```
foreach table in table__root.depth-first-search ( ) do
    if table.empty( ) then
        # delete this table.
        copy all entries for this table into parent table.
        replace link pointing to this table from parent table with
            the list of subtables of this table
```

TABLE 12-continued

```
    endif
endfor
```

The lookup table matcher 726 considers a table empty if the table contains no SVARs, and if the DVARs contained therein are temporaries created by the translator 302.

3.2.2.2. Step 906—Depth First Traversal

During step 906, the lookup table matcher 726 matches the entries in the translator lookup table 720 to their counterparts in the compiler lookup table 718. To accomplish step 906, the lookup table matcher 726 performs a side-by-side depth-first traversal of the two lookup tables 718, 720.

In a preferred embodiment of the present invention, the lookup table matcher 726 uses the pseudocode algorithm presented in Table 13 for performing step 906.

TABLE 13

```
matchup_tables (dtab *cpp_tab, dtab *ctab)
{
    point corresponding fields of cpp_tab and c_tab
        at each other.
    for each child of cpp_tab do
        get next child of c_tab;
        matchup_tables (cpp_tab_child, c_tab_child);
    endfor
}
```

The algorithm presented in Table 13 operates under the assumption that in both the compiler lookup table 718 and in the translator lookup table 720, corresponding tables (for functions, local blocks, etc.) appear in exactly the same order. This assumption is assured by step 902.

3.2.3. Step 810—Fix

To accomplish step 810, the lookup table fixer 744 performs a depth-first traversal of the matched translator lookup table 734.

Only the matched translator lookup table 734 is traversed. Each entry of each subtable in the matched translator lookup table 734 is looked up in the corresponding subtable in the matched compiler lookup table 732. If such an entry does not exist in the matched compiler lookup table 732, then the DNTT entry corresponding to this entry in the translator lookup table 734 is marked for deletion. Otherwise, information from the matched compiler lookup table 732 is copied to the matched translator lookup table 734.

The manner in which the lookup table fixer 744 copies information between the matched lookup tables 732, 734 is described in detail in the following sections.

3.2.3.1. DNTT Field Values

On finding a corresponding entry in the matched compiler lookup table 732, the lookup table fixer 744 copies all possible information to the entry in the matched translator lookup table 734. Specifically, for DVAR and FPARAM entries, the lookup table fixer 744 copies over stack offset values and register flag values.

For SVAR entries, the lookup table fixer 744 sets up a future fixup for symbol location values, and copies over symbol offset values, displacement values, and location values.

For FUNC entries, the lookup table fixer 744 copies over entryaddr values, optimize field values, lowaddr field values, and hiaddr field values. Depending on the implementation, the lookup table fixer 744 may also set up fixups for these fields.

For OBJECT_ID entries, the lookup table fixer 744 sets up fixups for object_ident field values.

3.2.3.2. SLT

The lookup table fixer 744 matches up corresponding DNTT BEGIN/DNTT END pairs with SLT_BEGIN/SLT_END pairs. The lookup table fixer 744 also matches up MODULE pairs and FUNCTION pairs. Any SLT or DNTT BEGIN/END entry that cannot be so matched is targeted for deletion (but see the discussion below).

Also, the lookup table fixer 744 inserts SLT_CLASS_SCOPE and SLT_WITH entries (and their corresponding SLT_ENDs), to match up the corresponding DNTT entries. The compiler 114 does not emit these since they are peculiar to the translator debug information 306.

Also, the lookup table fixer 744 inserts extra SLT_BEGIN/SLT_END pairs to match up with DNTT_BEGIN/DNTT_END pairs wrapped around class declarations inside functions. These must never be deleted.

To accomplish the above, the lookup table fixer 744 first sets up an initial SLT, and then augments the SLT. These two steps are described in detail in the following sections.

3.2.3.2.1. Set Up Initial SLT

As shown in Tables 6 and 7, the table nodes have fields for two SLT pointers: one to SLT_BEGIN (or FUNCTION or MODULE) and one to SLT_END corresponding to the DNTTs delimiting the block.

These nodes are properly set up for the matched compiler lookup table 732 but not for the matched translator lookup table 734. The lookup table fixer 744 performs the following steps to set up these nodes for the matched translator lookup table 734. First, the lookup table fixer 744 makes a copy of the SLT from the matched compiler lookup table 732 for modification for the matched translator lookup table 734. DNTT back pointers in this copy are cleared.

During the fix phase 810 (the lookup table fixer 744 does not insert or delete during this phase), the lookup table fixer 744 sets up the matched translator lookup table 734 to point to the corresponding SLT entries at the same offsets as the ones their matched compiler lookup table 732 counterparts point to (and, Of course, set up the corresponding back pointers for these new SLT entries).

After these two steps are complete, a few unmatched DNTT_BEGIN/DNTT_END pairs, and possibly a few unmatched SLT_BEGIN/SLT_END pairs, may exist. The lookup table fixer 744 targets these for deletion.

Also, the lookup table fixer 744 sets up some special marks on some of the SLT_BEGIN and SLT_FUNCTION nodes, indicating that some nodes will have to be created and inserted around them in a later SLT augmentation pass.

3.2.3.2.2. Augment SLT

As noted above, for some DNTT nodes, the lookup table fixer 744 creates SLT entries. These DNTT nodes are of two kinds.

First, DNTT_CLASS_SCOPE and DNTT_WITH nodes, which come respectively before and after the DNTT_FUNC node for a member function of a class (their corresponding DNTT_ENDs similarly bracket the DNTT_END of the function).

Second, specially marked DNTT_BEGIN and DNTT_END nodes, which are put out as wrappers around local class declarations inside functions. These nodes are not treated as ordinary BEGINs and ENDs (that is, no tables are built for them).

In the first case, the lookup table fixer 744 marks the unused field of the DNTT_FUNC with two bits, one bit each for the presence of a DNTT_CLASS_SCOPE before the function, and the presence of a DNTT_WITH after the function.

In the second case, simple marking is not possible. An arbitrary number of BEGIN-END pairs could exist, each appearing within a DNTT_BEGIN/DNTT_END pair, rather than a DNTT_FUNCTION/DNTT_END pair (that is, classes declared inside local blocks).

The concept of fake blocks is used to handle these situations.

Fake blocks are similar to "real blocks," except that during the table-building phase 802, when the lookup table builders 710, 712 see a marked BEGIN (or an END corresponding to such a marked BEGIN), the lookup table builders push and pop a separate stack of tables. When the last such entry is popped, the whole subtree is attached to the immediate outermost "real" table.

To fill out the SLT, the lookup table fixer 744 makes a pass over the SLT, transcribing it entry-by-entry to a new copy. The lookup table fixer 744 discards useless SLT entries (SLT_SRCFILEs ummatched by DNTT_SRCFILEs, for example) and inserts some SLT entries as mentioned above.

The lookup table fixer 744 maintains a counter of the number of added and deleted SLT entries. When a SLT_SPECIAL is encountered, the lookup table fixer 744 follows its DNTTPOINTER back to the DNTT, and adds this offset counter to its SLTPOINTER.

For each entry in the SLT, the lookup table fixer 744 takes the following actions.

For SLT_NORMAL entries, the lookup table fixer 744 copies them over to the matched translator lookup table 734, and increments both indices by one.

For SLT_SRCFILE entries, if the DNTT backpointer is DNTT_NTL, then the lookup table fixer 744 discards this SLT_SRCFILE entry and decrements the offset counter. Otherwise, the lookup table fixer 744 copies the DNTT backpointer over to the matched translator lookup table 734 (and adjusts the DNTT entry which is pointed to by the back pointer).

For SLT_BEGIN entries, if the DNTT backpointer is DNTT_NIL, then the lookup table fixer 744 discards this SLT_BEGIN entry and decrements the offset counter.

Otherwise, the lookup table fixer 744 copies over the node. The lookup table fixer 744 then looks at the DNTT_BEGIN pointed to by this node. During the fix phase 810, the lookup table fixer 744 stores a copy of the fake-block table tree into the unused pad word at the end of the DNTT_BEGIN. If this node is non-zero, then the lookup table fixer 744 performs a depth-first traversal of the fake-block tree.

While performing the depth-first traversal of the fake-block tree, the lookup table fixer 744 creates an SLT_BEGIN for each table visited on the way down. The DNTT pointer for these nodes is stored in the fakeblock node, and is used to set up the forward and back links from the DNTT to the SLT. The lookup table fixer 744 then increments the offset counter.

The lookup table fixer 744 also creates an SLT-END for each table on the way up, patching it up similarly and incrementing the offset counter.

For SLT_FUNCTION entries, the lookup table fixer 744 follows and locates the DNT_FUNCTION entries corresponding to these SLT entries. The lookup table fixer 744 checks for the flags indicating the presence of DNTT_CLASS_SCOPEs and/or DNTT_WITHs.

If the flags for a class scope are set, then the lookup table fixer 744 creates a SLT_CLASS_SCOPE and increments the offset counter. The lookup table fixer 744 searches backwards from the DNTT_FUNCTION to locate the DNTT_CLASS_SCOPE to match it up with.

Then, the lookup table builder 744 copies over the SLT_FUNCTION node, adjusting the DNTT_FUNCTION's SLT pointer by the offset counter.

If the DNTT_WITH flag is set, then the lookup table builder 744 creates a SLT WITH and similarly locates the DNTT_WITH and sets the forward and back pointers.

Finally, the lookup table builder 744 checks for fake blocks and follows the same procedure as for the DNTT_BEGIN.

For SLT_END entries, if the DNTT backpointer is DNTT_NIL, the lookup table builder 744 discards this entry and decrements the offset counter. Otherwise, the lookup table builder 744 checks the matching DNTT that started the scope (by finding the matching DNTT_END and looking at its beginscope field). If the matching DNTT is a DNTT_FUNCTION, and the class_scope or with flags are set, then the lookup table builder 744 creates SLT_ENDs to match the SLT_CLASS_SCOPE or SLT_WITH that were created, and patch up the pointers and offset counter accordingly. The lookup table builder 744 follows the same technique as for SLT_FUNCTIONs, namely, inserting an SLT_END for the class scope, copying over this END, and then inserting an SLT_END for the with.

For SLT_MODULE entries, the lookup table fixer 744 copies the entries over, since only one exists.

Following the completion of the above actions, a new SLT exists which is properly matched up element-for-element to the LNTT. Also, this new SLT does not contain unused entries.

3.2.3.3. Matching DNTT SRCFILEs and SLT SRCFILEs

SRCFILE entries are the least systematic part of the debug information setup. Different compilers have different policies about where to emit SRCFILEs.

Additionally, certain sacrosanct SRCFILE entries exist (for example, SRCFILE entries that immediately precede a FUNCTION entry).

Every node and table in the matched lookup tables 732, 734 has a pointer to the SRCFILE entry immediately preceding the node. In addition, each table node has a pointer to the SRCFILE immediately preceding the DNTT_END of the table.

The lookup table fixer 744 uses a heuristic approach to solve this problem.

When traversing the tree during the fixup phase 810, the lookup table fixer 744 skips over SRCFILE entries (they are in the matched translator lookup table 734 only for bookkeeping and debugging). Instead, at each table visited, the lookup table fixer 744 uses the following algorithm.

First, the lookup table fixer 744 fixes up the SRCFILE entry corresponding to the BEGIN of the block, using the SRCFILE entry of the corresponding table.

Second, the lookup table fixer 744 performs the depth-first traversal of the subtables of the matched translator lookup table 734 as described above.

Third, the lookup table fixer 744 fixes up the SRCFILE entry corresponding to the END of the block.

Fourth, for each entry in the matched translator lookup table 734, the lookup table fixer 744 fixes up the SRCFILE entry pointed to by this node.

The lookup table fixer 744 resets the last-seen SRCFILE to NULL when FUNCTION or BEGIN nodes are encountered. This is possible since SRCFILE will be modified by step 1 of the above algorithm.

Following the completion of the above four step algorithm, every SRCFILE corresponding to a FUNCTION is fixed up. Other SRCFILE entries are not critical, except those that change inside a function, and these will be handled by the lookup table fixer in steps 3 and 4.

3.2.4. Step 814—Clean Up

During step 814 the lookup table fixer 744 cleans up the Name and Type Tables by deleting the entries that were marked for deletion. The lookup table fixer 744 must exercise caution during this step due to the cross-links within the LNTT and GNTT.

The lookup table fixer 744 deletes, or nullifies, the entries in question by setting their kind field to K_NIL. If the entry is more than one DNTT_BLOCK long, then the second and subsequent blocks are also treated as raw DNTT BLOCKs, and have their kind fields set to K_NIL and their extension flag reset to 0 (thus causing the entry to look like several contiguous K_$_{NIL}$ blocks).

To perform the cleanup, the lookup table fixer 744 makes a final pass over the DNTT, looking for all "specially-marked" DNTT entries, and nullifies them as described above.

3.3. Output Object File Interface

As shown in FIG. 5, the output object file interface 514 creates a new object/debug file 316 and stores in the new object/debug file 316 the object code 124 and the combination of the translator debug information 306 and the compiler debug information 126.

Figure 10:
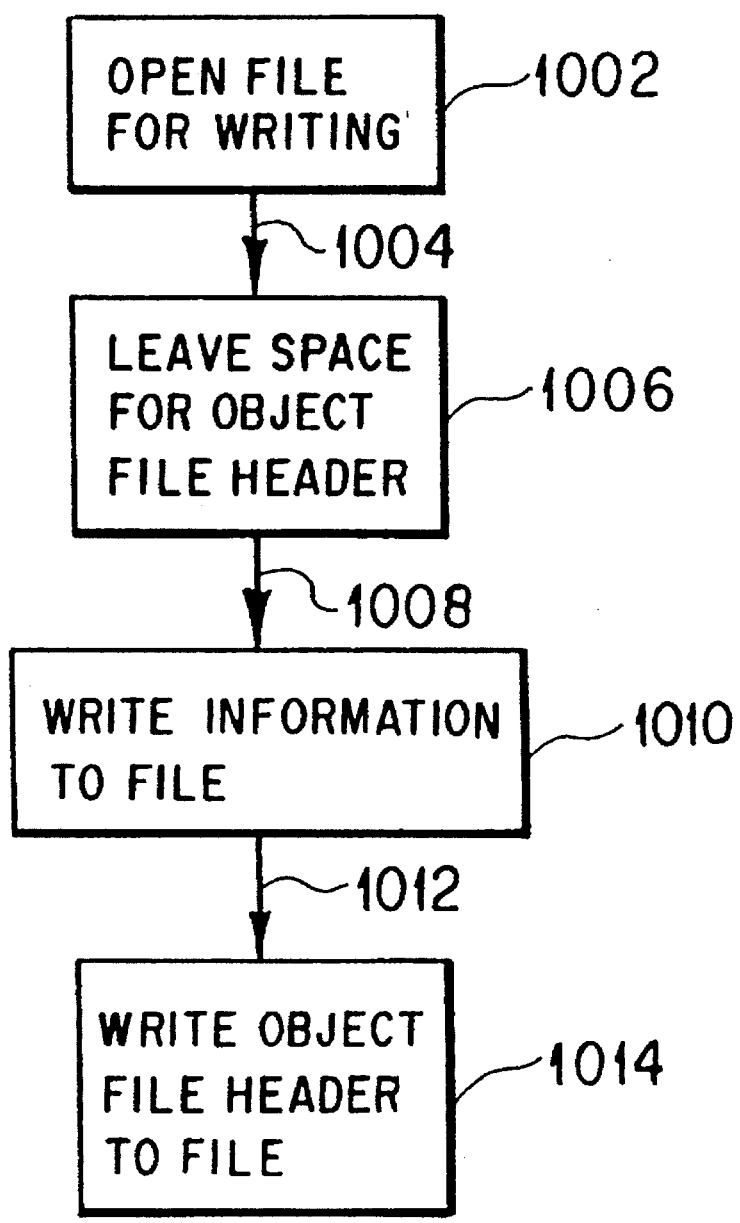
FIG. 10 shows a functional flowchart which illustrates the operation of the output object file interface, which is a module of the merger.

A flowchart of the output object file interface 514 is presented in FIG. 10. The operation of the output object file interface 514 is now described with reference to FIGS. 5, 7, and 10.

In step 1002, the output object file interface 514 creates a file 316 for writing.

In step 1006, the output object file interface 514 leaves space in the file 316 for the object file 124 header.

In step 1010, the output object file interface 514 writes information from the object code file 118, the merged lookup table 528, and the portable output fixups 530 to the file 316. The output object file interface 514 writes this information to the file 316 in the following order.

First, the output object file interface 514 writes text, then data, then any Pascal interfaces, if present, to the file 316.

The output object file interface 514 then writes the symbol table to the file 316. This is done by copying the symbol table from the object code file 118 to the file 316. Then, symbols are added using the function add_symbol() (Table 4 and 5). Finally, the symbol table size is adjusted in the object file header.

The output object file interface 514 then writes Supsyms, text relocation records, and data relocation records to the file 316.

The output object file interface 514 then writes debug information which comprises an extension header, a debug header, the GNTT, LNTT, SLT and VT (and XT, if any), and any additional extension sections, to the file 316. Also, the extension header offset and size are recorded in the object file header.

In step 1014, the output object file interface 514 writes the object file header at offset 0 to the file 316.

In the preferred embodiment of the present invention 228, the output object file interface 514 is implemented in the form of classes. Instantiations of these classes are used to read from and write to files containing object code and debug information.

The classes for the output object file interface 514 are the same as the classes for the input object file interfaces 502, 504. The classes, data structures, and functions which comprise these classes are presented in Tables 2, 3, 4, and 5.

The operation of the output object file interface 514 is implemented by calling functions from the classes represented in Tables 2, 3, 4, and 5. For example, when operating on HP9000 series 300 computer platforms 202, a function write_debug_info() is used to write debug information 750 to the file 316. Also, a function copy() is used to write the object code 124 to the file 316.

4.0. Debugger

Figure 11:
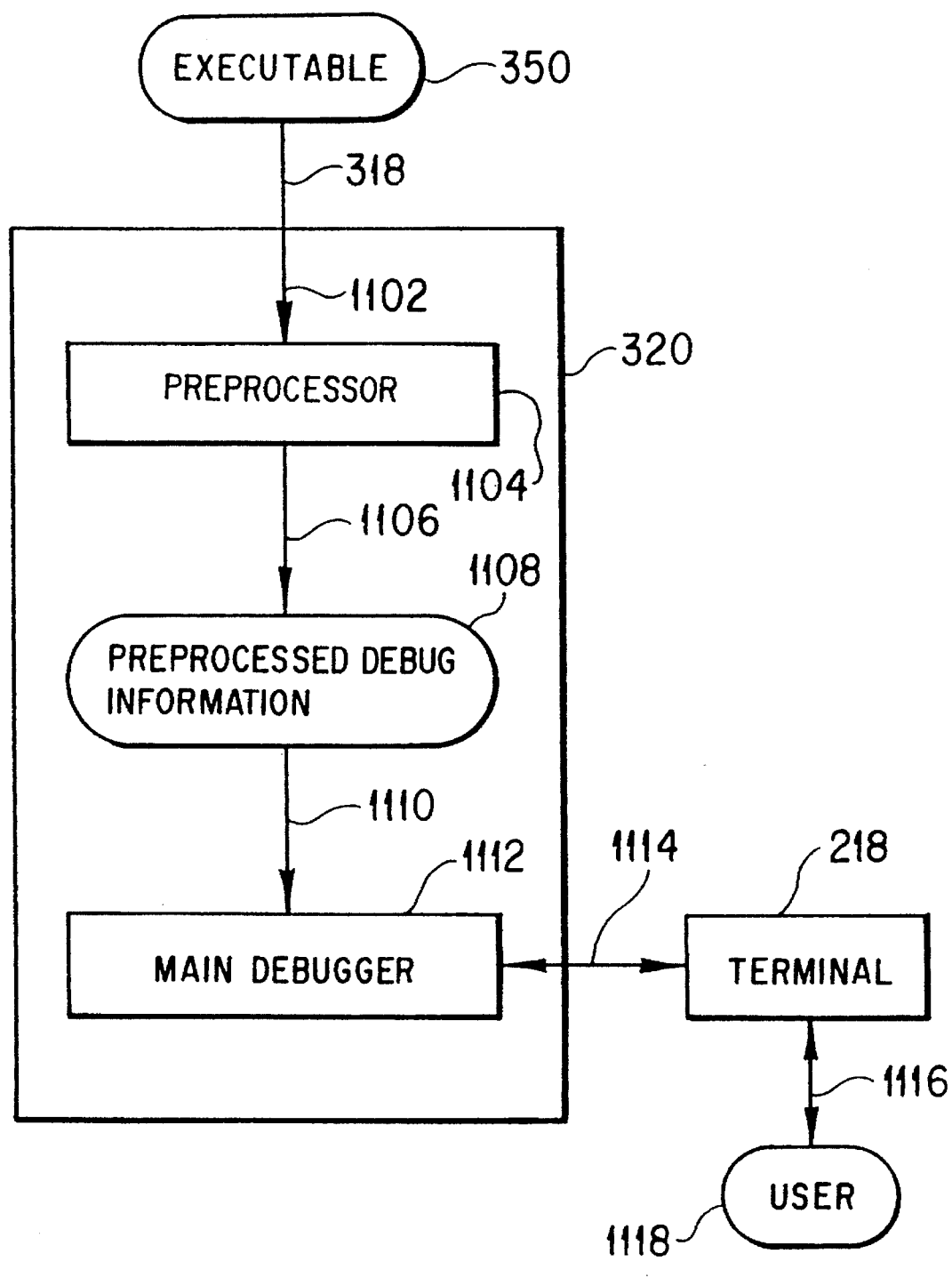
FIG. 11 shows a structural diagram/functional flowchart of a preferred embodiment of the debugger, which is a module of the present invention.

FIG. 11 shows a structural diagram/functional flowchart of the debugger 320 of the present invention 228. In FIG. 11, other than the terminal 218 and a user 1118, rectangles represent software modules/processes and ovals represent the inputs and outputs of the software modules/processes.

As shown in FIG. 11, the debugger 320 includes two modules, a preprocessor 1104 and a main debugger 1112.

The preprocessor 1104 receives the executable file 350 (the executable file 350 includes the final debug information 316) and generates a preprocessed debug information 1108. The preprocessed debug information 1108 is the same as the final debug information 316, except the preprocessor 1104 removes duplicate information, fixes up pointers between various parts of the information, and collects certain data into special tables (not shown in FIG. 11) which are added to the preprocessed debug information 1108 for use by the main debugger 1112.

Specifically, the preprocessor 1104 creates a source file descriptor table, a procedure descriptor table, a class descriptor table, and an address alias table (not shown in FIG. 11).

The source file descriptor table contains a description of where sections of generated code map to in the source code 102. The source file descriptor table comprises source file descriptor entries. A source file descriptor entry contains, among other things, a start and end address, which indicate the range of code addresses covered by the file descriptor, and the name of the source file from which the code was generated. For the main debugger 1112 to work correctly, the address range described by the file descriptor must cover a monotonically non-decreasing source line range. This means a source file can have several file descriptors associated with it.

The procedure descriptor table contains a description of all the debuggable procedures and/or functions in the program 102. The C++ specific information initialized by the preprocessor 1104 indicates if the function is duplicated somewhere else in the program 102, is overloaded, is a member function (and if so, of what class), is a constructor, is a destructor, is static, is virtual, is pure virtual, is constant, has been inclined, and/or is an operator function.

The class descriptor table describes the scope of each class by indicating the range of source lines in source code 102 for which the class is defined.

The address alias table describes multiple sections of code, if any, in the object code 124 which were generated from a single section of source code 102.

The main debugger 1112 receives the preprocessed debug information 1108. Under the direction of a user 1118, who communicates with the main debugger 112 via the terminal 218, the main debugger 1112 uses the preprocessed debug information 1108 to aid the user 1118 in locating and correcting errors in the source code 102.

Specifically, the main debugger 1112 uses the preprocessed debug information 1108 to, among other things, display the source code 102, display the assembly code translation of the source code 102 generated by the compiler 114, to control and alter the flow of execution through the source code 102, to display variable types, and to view and set variable values.

The structure and operation of the debugger 320 is similar to that of the conventional debugger 122. However, the debugger 320 of the present invention 228 is an improvement upon conventional debuggers 122 in that the debugger 320 contains additional and modified features that take advantage of the additional information in the final debug information 316, that is, the combination of the compiler debug information 118 and the translator debug information 306.

In the preferred embodiment of the present invention 228, the debugged 320 comprises many modified and additional features to take advantage of the C++ related information contained in the final debug information 316.

For example, the debugger 320 of the present invention 228 can display additional function type information not available in conventional debuggers 122. When applicable, this additional information indicates whether a particular function was declared as inclined, overloaded, static, constant, or virtual, and also if the function was declared as a member function, operator function, a constructor, or a destructor. The final debug information 316 also allows the debugger 320 to display type information for a function which was declared in source code 102 but not given a definition.

The debugger 320 provides for the C++ anonymous union feature by using the debug information 1108. The debug information 1108 effectively specifies each anonymous union member in two forms. One form specifies the anonymous union member as if it were outside the anonymous union. This allows the user 1118 to view and modify the anonymous union member as an individual variable.

The other form is to specify the anonymous union member as a member of the anonymous union. This allows the user 1118 to view type and data information for the anonymous union as a whole.

All members of a given anonymous union are represented in the final debug information 316 as a linked list of structures with each node specifying information about that member and containing a pointer to the member in its form outside of the anonymous union. For example, a local anonymous union having three members would have debug information which would be the same as if these three members were not part of an anonymous union. Then additional anonymous union debug information would have a linked list of three structures which respectively point to the debug information for these three members.

The debugger 320 also provides for "enums" defined within a class. This feature is implemented in a manner similar to that for anonymous unions. Each enum member is represented in two forms. One form is as part of the list of enum members declared for a particular enum type. In the second form, each enum member is represented as if it were an individual member of the class in which it is found. The first form allows the user 1118 to use each enum member individually with the only qualification being to designate in which class it is found.

The debugger 320 also provides for multiple identical code segments associated with a given section of the source code 102. For example, in C++, a member function defined in a particular source file of source code 102 may be included into other source files of source code 102.

Although there is only one copy of the source code for this member function, it will be translated by the translator 106 into multiple copies for compilation by the compiler 114. In turn, the object code and debug information 118 produced by the compiler 114 will contain multiple code segments corresponding to this same member function.

The preprocessor 1104 collects the address ranges for these multiple code segments from the final debug information 316 into the address alias table and passes this table in the preprocessed debug information 1108 to the debugger 1112. Each entry in the address alias table contains the beginning and ending addresses for one code segment and information to indicate all other code segment entries in the table which are its aliases.

When the debugger 1112 performs an operation involving a code address, it can reference this address alias table to discover all individual addresses which are aliases of the given code address. If the code address falls within the address range of a particular entry in the address alias table, the debugger 1112 computes the offset from the beginning address of the entry to the given address. It can then compute the set of addresses which are aliases of the given code address by adding the computed offset to the beginning address of all of the code segment's aliases.

Also, the debugger 320 provides for class scopes. The user 1118 may specify a class member to be used in a command expression by explicitly stating the class according to C++ syntax. For example, the member may be given as A::B, where A is the class and B is a member of class A. If the class and, when necessary, the class object are implied by the current viewing location, the user 1118 need not explicitly state the class name because the class scope implies it.

In these cases, the viewing location in the source code 102 maps to a code address determined from the file descriptor table. This code address maps to a function determined from the procedure descriptor table. This function maps to a class in the class descriptor table which points to all of the information the debugger 320 needs concerning the class itself, its base classes, and its scope.

The debugger 320 also handles pointers to class members, such that the value assigned to such a pointer and the value displayed from printing such a pointer uses the class and member identifiers themselves instead of numerical values. For example, printing the value of a particular pointer to a class member called P may display:

P=&M::N where M is the class, and N is a member of class M. Internally, the pointer is represented as a numerical constant of offset, but with the additional class debug information, the debugger 1112 can determine which class member this number corresponds to and print the actual identifier instead of a number.

The debugger 320 also handles instance breakpoints. That is, the debugger 320 allows the user 1118 to set a breakpoint at a member function such that the breakpoint is recognized only if the function is invoked with a particular object.

The debugger 320 does this by saving the address of the object with the breakpoint itself. When the breakpoint is hit, the debugger 320 can determine, with the aid of the debug information 1108, the address of the object on which the function was invoked, compare it with the stored address, and suspend debugger execution only if the two are equal. Otherwise, the debugger silently continues with the user 1118 experiencing no execution suspension.

The debugger also provides for automatic deletion of an instance breakpoint when execution leaves the scope in which the object is defined.

In cases where the scope of the object can be determined, the debugger 320 also sets an additional breakpoint called a trigger breakpoint at the point in the object code where execution will leave this scope. When this breakpoint is hit, both the instance breakpoint with which it is associated and the trigger breakpoint itself are removed and execution continues.

The debugger 320 also handles class breakpoints. Because the debug information 316 indicates the member functions of any given class and of any base classes of that class, the debugger 320 allows the user 1118 to set a breakpoint on all member functions of a particular class with a single command. This class breakpoint suspends execution of the object code whenever any of the class's member functions is invoked.

Also, the debugger 320 allows the user 1118 to qualify a location in the source code 102 by specifying a class name when the user wants to view that location or set a breakpoint there. For example, if the user 118 wants to view function f which is a member of class C, this location may be specified as C::f as an argument to the view command. The debugger 320 performs this operation by referring to the class descriptor table to determine a class by the given name which is visible in the current scope. It then refers to the procedure descriptor table, looking for a function with the given name whose descriptor refers back to the previously located entry in the class descriptor table.

The debugger 320 also handles operations on any set of overloaded functions as a group. The user 1118 may request that the debugger 320 print type information for all overloaded functions with a particular name, optionally qualified by a particular class. Similarly, the user 1118 may also set a breakpoint on all overloaded functions with a particular name, also optionally qualified by a particular class. The debugger 320 uses information concerning overloaded functions found in the procedure descriptor table which the preprocessor 1104 has created from the debug information 316.

What is claimed is:

1. A computer-based system for generating meaningful symbolic debug information for a source code, adapted for use in translator-based software compilers, the system comprising:

(1) first means for generating a translator debug information for the source code;
   (2) second means comprising:
      (a) means for generating an object code for the source code;
      (b) means for generating a compiler debug information for the source code; and
      (c) means for storing said object code and said compiler debug information in a first object code file; and
   (3) third means for merging said translator and compiler debug information to form final debug information for the source code, wherein said final debug information completely and accurately represents the source code.

2. The system of claim 1, further comprising:

(4) fourth means for locating and correcting errors in the source code by using said final debug information.

3. The system of claim 2, wherein said fourth means comprises:

(1) means for displaying function type information;
   (2) means for providing for anonymous unions;
   (3) means for providing for enums defined within classes;
   (4) means for providing for multiple identical code segments;
   (5) means for providing for class scopes;
   (6) means for processing instance breakpoints;
   (7) means for processing pointers to class members;
   (8) means for processing class breakpoints; and
   (9) means for processing group operations on sets of overloaded functions.

4. The system of claim 1, further comprising means for generating an intermediate source code, wherein said intermediate source code represents an intermediate compiled version of the source code.

5. The system of claim 4, wherein the source code is written in a C++ computer programming language, and said intermediate source code is written in a C computer programming language.

6. The system of claim 1, wherein said third means comprises:

(1) fourth means for generating first and second debug data structures from said translator and compiler debug information;
   (2) fifth means for generating a merged lookup table from said translator and compiler debug data structures, wherein said merged lookup table comprises said final debug information; and
   (3) sixth means for storing said object code and said final debug information in a second object code file.

7. The system of claim 6, wherein said second means for generating a merged lookup table comprises:

(1) first means for generating first and second lookup tables from said first and second debug data structures;
   (2) second means for matching said first and second lookup tables so that entries in said first lookup table have corresponding entries in said second lookup table; and
   (3) third means for copying portions of said compiler debug information from said lookup table to said first lookup table, wherein said first lookup table comprises said merged lookup table.

8. The system of claim 1, wherein said translator debug information completely and accurately reflects the structure of said source code, but lacks information regarding machine addresses and architecture.

9. The system of claim 1, wherein said compiler debug information includes information regarding machine addresses and architecture, but does not completely and accurately reflect the structure of said source code.

10. A method for generating meaningful symbolic debug information for a source code, adapted for use in translator-based software compilation systems, the method comprising the steps of:

(a) generating translator debug information for the source code;

(b) generating an intermediate source code for the source code;

(c) generating compiler debug information for the source code;

(d) generating an object code for the source code;

(e) merging said translator and compiler debug information to form final debug information for the source code;

wherein said final debug information completely and accurately represents the source code.

11. The method of claim 10, further comprising the step of:

(f) locating and correcting errors in the source code by using said final debug information.

12. The method of claim 11, wherein said step for locating and correcting errors comprises the steps of:

(a) displaying function type information;

(b) providing for anonymous unions;

(c) providing the enums defined within classes;

(d) providing for multiple identical code segments;

(e) providing for class scopes;

(f) processing instance breakpoints;

(g) processing pointers to class members;

(h) processing class breakpoints; and (i) processing group operations on sets of overload functions.

13. The method of claim 10, wherein the step of merging comprises the steps of:

(a) reading said translator and compiler debug information;

(b) generating first and second debug data structures from said translator and compiler debug information;

(c) generating a merged lookup table from said first and second debug data structures, wherein said merged lookup table comprises said final debug information; and (d) storing said object code and said final debug information in an object code file, wherein said object code file includes an object code file header.

14. The method of claim 13, wherein said step for generating a merged lookup table comprises the steps of:

generating first and second lookup tables from said first and second debug data structures;

(b) matching said first and second lookup tables so that entries in said first lookup table have corresponding entries in said second lookup table;

(c) copying portions of said compiler debug information from said second lookup table to said first lookup table;

(d) marking entries in said first lookup table for deletion; and (e) deleting said entries marked for deletion in said first lookup table;

wherein said first lookup table comprises said merged lookup table.

15. The method of claim 14, wherein the step for matching comprises the steps of:

(a) reducing said first and second lookup tables to their most compact form; and (b) performing a depth-first traversal of said first lookup table.

16. The method of claim 13, wherein the step for storing comprises the steps of:

(a) opening said object code file for writing;

(b) defining a header area in said object code file;

(c) storing said object code and said information from said merged lookup table in said object code file, outside of said header area; and (d) storing said object code file header in said header area.

17. The method of claim 10, wherein the source code is written in a C++ computer programming language, and said intermediate source code is written in a C computer programming language.

18. The method of claim 10, wherein said translator debug information completely and accurately reflects the structure of said source code, but lacks information regarding machine addresses and architecture.

19. The method of claim 10, wherein said compiler debug information includes information regarding machine addresses and architecture, but does not completely and accurately reflect the structure of said source code.

20. A computer program product having a computer readable medium having computer program logic recorded thereon for generating meaningful symbolic debug information for a source code, said computer program product comprising:

(1) first means for generating translator debug information for a source code;

(2) second means for generating compiler debug information for said source code; and (3) third means for merging said translator and compiler debug information to form final debug information for said source code;

wherein said final debug information completely and accurately represents said source code.

21. The system of claim 20, further comprising:

(4) fourth means for locating and correcting errors in said source code by using said final debug information.

22. A computer-based system for merging translator debug information and compiler debug information to form final debug information for a source code, adapted for use with an object code of the source code, wherein said final debug information completely and accurately represents the source code, the system comprising:

(1) first means for generating first and second debug data structures from said translator and compiler debug information;

(2) second means for generating a merged lookup table from said first and second debug data structures, wherein said merged lookup table comprises said final debug information; and (3) third means for storing the object code and said final debug information in a second object code file.

23. The system of claim 22, wherein said second means for generating a merged lookup table comprises:

(1) fourth means for generating first and second lookup tables from said first and second debug data structures;

(2) fifth means for matching said first and second lookup tables so that entries in said first lookup table having corresponding entries in said second lookup table; and (3) sixth means for copying portions of said compiler debug information from said second lookup table to said first lookup table, wherein said first lookup table comprises said merged lookup table.

24. A method for merging translator debug information and compiler debug information to form final debug information for a source code, adapted for use with an object code of the source code, wherein said final debug information completely and accurately represents the source code, the method comprising the steps of:

(a) reading said translator and compiler debug information;

(b) generating first and second debug data structures from said translator and compiler debug information;

(c) generating a merged lookup table from said first and second debug data structures, wherein said merged lookup table comprises said final debug information; and (d) storing said object code and said final debug information in an object code file, wherein said object code file includes an object code file header.

25. The method of claim 24, wherein said step for generating a merged lookup table comprises the steps of:

(a) generating first and second lookup tables from said first and second debug data structures;

(b) matching said first and second lookup tables so that entries in said first lookup table have corresponding entries in said second lookup table;

(c) copying portions of said compiler debug information from said second lookup table to said first lookup table;

(d) marking entries in said first lookup table for deletion; and (e) deleting said entries marked for deletion in said first lookup table; wherein said first lookup table comprises said merged lookup table.

26. The method of claim 25, wherein the step for matching comprises the steps of:

(a) reducing said first and second lookup tables to their most compact form; and (b) performing a depth-first traversal of said first lookup table.

27. The method of claim 24, wherein the step for storing comprises the steps of:

(a) opening said object code file for writing;

(b) defining a header area in said object code file;

(c) storing said object code and said information from said merged lookup table in said object code file, outside of said header area; and (d) storing said object code file header in said header area.

* * * * *